US012212052B2

(12) United States Patent
Wang et al.

(10) Patent No.: US 12,212,052 B2
(45) Date of Patent: Jan. 28, 2025

(54) ANTENNA AND ELECTRONIC DEVICE

(71) Applicant: Huawei Technologies Co., Ltd., Shenzhen (CN)

(72) Inventors: Jiaming Wang, Shanghai (CN); Liang Xue, Shanghai (CN); Jiahui Chu, Shanghai (CN); Jiaqing You, Shanghai (CN); Lijun Ying, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 217 days.

(21) Appl. No.: 17/637,370

(22) PCT Filed: Aug. 7, 2020

(86) PCT No.: PCT/CN2020/107867
§ 371 (c)(1),
(2) Date: Feb. 22, 2022

(87) PCT Pub. No.: WO2021/036753
PCT Pub. Date: Mar. 4, 2021

(65) Prior Publication Data

US 2022/0278446 A1 Sep. 1, 2022

(30) Foreign Application Priority Data

Aug. 23, 2019 (CN) ........................ 201910794483.X

(51) Int. Cl.
*H01Q 1/38* (2006.01)
*H01Q 1/24* (2006.01)
*H01Q 5/10* (2015.01)

(52) U.S. Cl.
CPC ............... *H01Q 1/38* (2013.01); *H01Q 1/243* (2013.01); *H01Q 5/10* (2015.01)

(58) Field of Classification Search
USPC .......................................................... 343/893
See application file for complete search history.

(56) References Cited

U.S. PATENT DOCUMENTS 7,298,340 B2 * 11/2007 Ohba .................... H01Q 5/371 343/702
9,786,994 B1 10/2017 Lee et al.
(Continued)

FOREIGN PATENT DOCUMENTS

AU 2019100180 A4 3/2019
CN 1306318 A 8/2001
(Continued)

OTHER PUBLICATIONS

Li Haifeng et al., "Simulation Design of Dual-band PIFA Mobile Phone Antenna," Digital Technology and Application, Issue 8, Total 3 pages (2016). With an English abstract.

*Primary Examiner* — Hoang V Nguyen
*Assistant Examiner* — Brandon Sean Woods
(74) *Attorney, Agent, or Firm* — Leydig, Voit & Mayer, Ltd.

(57) ABSTRACT

This application provides an antenna having an L-shaped antenna body. The antenna body comprises a first end, a second end, and a feed point, a physical length between the feed point and the first end is greater than a physical length between the feed point and the second end, the antenna body generates resonance of a first wavelength between the feed point and the first end, and the antenna body generates resonance of a second wavelength between the first end and the second end, wherein the first wavelength is greater than the second wavelength. The antenna can have relatively good radiation performance regardless of whether the electronic device is in free space (FS) or in a handheld state.

28 Claims, 16 Drawing Sheets

(56) References Cited

U.S. PATENT DOCUMENTS

| | | | |
|---|---|---|---|
| 10,389,010 | B2 | 8/2019 | Lee et al. |
| 10,468,756 | B2 * | 11/2019 | Han ....................... H01Q 21/28 |
| 2002/0044090 | A1 | 4/2002 | Bahr et al. |
| 2005/0270243 | A1 | 12/2005 | Caimi et al. |
| 2015/0061951 | A1 | 3/2015 | Wong et al. |
| 2016/0352017 | A1 | 12/2016 | Nishizono et al. |
| 2017/0062932 | A1 | 3/2017 | Foster et al. |
| 2019/0067797 | A1 | 2/2019 | Jung et al. |
| 2019/0081410 | A1 | 3/2019 | Zhou et al. |
| 2019/0260126 | A1 | 8/2019 | Vazquez et al. |

FOREIGN PATENT DOCUMENTS

| | | | |
|---|---|---|---|
| CN | 101730957 | A | 6/2010 |
| CN | 101997164 | A | 3/2011 |
| CN | 102013568 | A | 4/2011 |
| CN | 102544774 | A | 7/2012 |
| CN | 102576932 | A | 7/2012 |
| CN | 102576936 | A | 7/2012 |
| CN | 103887596 | A | 6/2014 |
| CN | 106876897 | A | 6/2017 |
| CN | 107275753 | A | 10/2017 |
| CN | 107437661 | A | 12/2017 |
| CN | 107959103 | A | 4/2018 |
| CN | 108183332 | A | 6/2018 |
| CN | 108336483 | A | 7/2018 |
| CN | 108631040 | A | 10/2018 |
| CN | 108808221 | A | 11/2018 |
| CN | 108879116 | A | 11/2018 |
| CN | 208284641 | U | 12/2018 |
| CN | 109149072 | A | 1/2019 |
| CN | 109149086 | A | 1/2019 |
| CN | 109462016 | A | 3/2019 |
| CN | 208622935 | U | 3/2019 |
| CN | 109687111 | A | 4/2019 |
| CN | 109687151 | A | 4/2019 |
| CN | 209169370 | U | 7/2019 |
| CN | 110649371 | A | 1/2020 |
| CN | 110741506 | A | 1/2020 |
| CN | 111628275 | A | 9/2020 |
| CN | 111628298 | A | 9/2020 |
| EP | 3035442 | A1 | 6/2016 |
| EP | 3220478 | A1 | 9/2017 |
| EP | 3451636 | A1 | 3/2019 |
| JP | 2018007152 | A | 1/2018 |
| JP | 2018207346 | A | 12/2018 |
| JP | 2019506790 | A | 3/2019 |
| KR | 20070021947 | A | 2/2007 |
| KR | 20170020013 | A | 2/2017 |
| KR | 20180032495 | A | 3/2018 |
| KR | 20180094636 | A | 8/2018 |
| WO | 2018027921 | A1 | 2/2018 |
| WO | 2018232677 | A1 | 12/2018 |

* cited by examiner

ANTENNA AND ELECTRONIC DEVICE

CROSS-REFERENCE TO RELATED APPLICATIONS

This application is a National Stage of International Patent Application No. PCT/CN2020/107867, filed on Aug. 7, 2020, which claims priority to Chinese Patent Application No. 201910794483.X, filed on Aug. 23, 2019, both of which are hereby incorporated by reference in their entireties.

TECHNICAL FIELD

This application relates to the field of communications technologies, and in particular, to an antenna and an electronic device that includes the antenna.

BACKGROUND

Currently, in design of an antenna solution of an electronic device such as a mobile phone, a through-slot in metal is usually used to implement a communication function. To be specific, a plurality of spaced slots are disposed on a conductive frame, and a part between adjacent slots forms an antenna body of an antenna. In a current electronic device, a slot is usually disposed on two opposite edges of a frame of the electronic device, and therefore an antenna mainly generates horizontal mode excitation or vertical mode excitation. Consequently, the horizontal mode excitation and the vertical mode excitation are not balanced. When the electronic device is held by a hand, the slot on the frame is easily blocked. In this case, the horizontal mode excitation or the vertical mode excitation of the antenna is weakened, causing a death grip. Consequently, radiation performance of the antenna is affected.

SUMMARY

This application provides an antenna and an electronic device, to resolve a problem that horizontal mode excitation and vertical mode excitation of an antenna are not balanced, so that the antenna still has relatively good antenna radiation performance in a handheld state.

According to a first aspect, this application provides an antenna. The antenna includes an L-shaped antenna body. The antenna body includes a first section and a second section that intersects with the first section. The antenna body includes a feed point and a grounding point that are disposed with an interval. The feed point is configured to connect to a radio frequency front end. The grounding point is used for grounding. The antenna body includes a first end and a second end that are away from each other. The first end is an end that is of the first section and that is far away from the second section. The second end is an end that is of the second section and that is far away from the first section. An electrical length between the feed point and the first end is greater than an electrical length between the feed point and the second end. The antenna body generates resonance of a first wavelength in a quarter wavelength mode between the feed point and the first end, and the antenna body generates resonance of a second wavelength in a half wavelength mode between the first end and the second end. The first wavelength is greater than the second wavelength.

The antenna may be of a frame antenna (namely, an antenna whose antenna body is a frame of an electronic device), an antenna form of a flexible printed circuit (FPC), an antenna form of a laser direct structuring (LDS), or a microstrip disk antenna (MDA), or the like. When the antenna is in the antenna form of a flexible printed circuit, the antenna body may be of a linear strip structure, and during use, the antenna body is bent to form the L-shaped antenna body.

The antenna body generates the resonance of the first wavelength in the quarter wavelength mode between the feed point and the first end. In other words, the electrical length between the feed point and the first end is approximately the first wavelength in the quarter wavelength mode, so that the antenna body can generate the resonance of the first wavelength in the quarter wavelength mode between the feed point and the first end. The antenna body generates the resonance of the second wavelength in the half wavelength mode between the first end and the second end. In other words, an electrical length between the first end and the second end is approximately the second wavelength in the half wavelength mode, so that the antenna body can generate the resonance of the second wavelength in the half wavelength mode between the first end and the second end. In some embodiments, the first wavelength and the second wavelength are operating wavelengths of signals whose radiation frequencies fall within a same frequency band (for example, B28, B5, or B8) in an LTE standard.

In this embodiment of this application, the electrical length between the feed point and the first end is greater than the electrical length between the feed point and the second end, and therefore it is set that an electrical length of a section (a section between the feed point and the first end) of a relatively long electrical length is approximately a quarter wavelength, to generate the resonance of the first wavelength in the quarter wavelength mode between the feed point and the first end, so that the resonance of the first wavelength in the quarter wavelength mode in this embodiment of this application can have a relatively large radiation aperture. Therefore, the antenna has relatively good radiation performance. Mode excitation in a direction perpendicular to a side on which the first end is located can be generated based on the resonance that is of the first wavelength in the quarter wavelength mode between the feed point and the first end and that is generated by the antenna body. In this embodiment of this application, the first end is an end that is of the first section and that is far away from the second section. However, in some embodiments, the first section is located in a horizontal direction or a vertical direction, that is, horizontal mode excitation or vertical mode excitation can be generated based on the resonance that is of the first wavelength in the quarter wavelength mode and that is of the antenna. The resonance of the second wavelength in the half wavelength mode is formed between the first end and the second end, and the antenna body is L-shaped, and therefore mode excitation in a direction perpendicular to the first section and mode excitation in a direction perpendicular to the second section can be generated. In some embodiments, horizontal mode excitation and vertical mode excitation can be generated, which can assist in enhancing the mode excitation generated based on the resonance of the first wavelength in the quarter wavelength mode, so that horizontal mode excitation and vertical mode excitation of the antenna can be relatively balanced. Therefore, the antenna still has relatively good antenna radiation performance in a handheld state. In other words, in this application, the antenna body can generate both the resonance of the first wavelength in the quarter wavelength mode and the resonance of the second wavelength in the half wavelength mode, and the mode excitation generated based on the resonance of the first wavelength in the quarter wavelength mode and mode excitation in the other direction can be enhanced by using the resonance of the second wavelength in the half wavelength mode, so that the horizontal mode excitation and the vertical mode excitation of the antenna are relatively balanced.

The mode excitation means that port excitation is added to the antenna to enable the antenna to generate a different mode. The mode excitation is represented by different distribution of characteristic currents generated by excitation on the antenna. For example, in this embodiment of this application, the mode excitation in a direction perpendicular to the side on which the first end is located is generated based on the resonance that is of the first wavelength in the quarter wavelength mode and that is of the antenna, that is, a main flow direction of a characteristic current generated after excitation is added to the antenna ground is perpendicular to the direction of the side on which the first end is located. When the direction of the side on which the first end is located is the horizontal direction, vertical mode excitation is mainly generated. When the direction of the side on which the first end is located is the vertical direction, horizontal mode excitation is mainly generated. The mode excitation in a direction perpendicular to the first section and the mode excitation in a direction perpendicular to the second section are generated based on the resonance that is of the second wavelength in the half wavelength mode and that is of the antenna, that is, a main flow direction of a characteristic current generated after excitation is added to the antenna ground is perpendicular to the direction of the side on which the first end is located and a direction of a side on which the second end is located.

In this embodiment of this application, the first wavelength is greater than the second wavelength, that is, a frequency of the resonance generated between the feed point and the first end is less than a frequency of the resonance generated between the first end and the second end, to avoid generating an efficiency pit when the resonance of the first wavelength in the quarter wavelength mode and the resonance of the second wavelength in the half wavelength mode are at a same operating frequency band, so that the antenna can have good radiation performance at the operating frequency band.

In some embodiments, a difference between the frequency of the resonance generated between the feed point and the first end and the frequency of the resonance generated between the first end and the second end ranges from 50 MHz to 200 MHz, to implement better compatibility between the resonance of the first wavelength in the quarter wavelength mode and the resonance of the second wavelength in the half wavelength mode. Therefore, the antenna can have good radiation performance both in free space and in the handheld state.

In some embodiments, the antenna includes a first switching circuit, a first connection point is disposed on the antenna body, the first connection point is located on a side that is of the feed point and the grounding point and that is far away from the second end, one end of the first switching circuit connects to the first connection point, and the other end is grounded, and the first switching circuit is configured to change the electrical length between the feed point and the first end. In this embodiment of this application, the first switching circuit connects to the first connection point, that is, the first switching circuit connects to the antenna body through the first connection point. In this way, the electrical length between the feed point and the first end and the electrical length between the first end and the second end can be changed by using the first switching circuit, to change the operating frequencies of the resonance of the first wavelength in the quarter wavelength mode and the resonance of the second wavelength in the half wavelength mode.

In some embodiments, the first connection point may be alternatively located on a side that is of the feed point and the grounding point and that is far away from the first end, to change the electrical length between the feed point and the second end and the electrical length between the first end and the second end, so as to change the operating frequency of the resonance of the second wavelength in the half wavelength mode.

In some embodiments, the antenna includes a second switching circuit, a second connection point is further disposed on the antenna body, the feed point and the grounding point are located between the first connection point and the second connection point, one end of the second switching circuit connects to the second connection point, and the other end is grounded, and the second switching circuit is configured to change the electrical length between the feed point and the second end. In this embodiment of this application, the second switching circuit connects to the second connection point, that is, the second switching circuit connects to the antenna body through the second connection point, to change the electrical length between the feed point and the second end. The first switching circuit changes the electrical length between the feed point and the first end, to change the operating frequency of the resonance of the first wavelength in the quarter wavelength mode. The second switching circuit cooperates with the first switching circuit, to change an electrical length (namely, the electrical length between the first end and the second end) of the antenna body, so as to change the operating frequency of the resonance of the second wavelength in the half wavelength mode.

It may be understood that in some embodiments, a position of the first switching circuit and a position of the second switching circuit may be interchanged.

In some embodiments, the first switching circuit includes a first switch and a plurality of different first tuning elements that are grounded, and the first switch connects to the different first tuning elements through switching, to change the electrical length between the feed point and the first end. The first switch connects to different first tuning elements through switching, so that different first tuning elements connect to the antenna body. The different first tuning elements may be tuning elements of different types, for example, may be capacitors, inductors, or resistors. Alternatively, the different first tuning elements may be tuning elements that are of a same type and that differ in specification and size. For example, all the tuning elements are inductors, but the tuning elements have different inductance values. Different first tuning elements connect to the antenna body, to change the electrical length between the first end and the second end and the electrical length between the feed point and the first end that are of the antenna body, so as to adjust the operating frequencies of the resonance of the first wavelength in the quarter wavelength mode and the resonance of the second wavelength in the half wavelength mode that are generated by the antenna body.

In some embodiments, the first switching circuit includes a first switch and a plurality of different first tuning elements that are grounded, the second switching circuit includes a second switch and a plurality of different second tuning elements that are grounded, the plurality of first tuning elements are in a one-to-one correspondence with the plurality of second tuning elements, and when the first switch connects to the different first tuning elements through switching, the second switch connects, through switching, to a second tuning element corresponding to a first tuning element that connects to the first switch. Different second tuning elements may be tuning elements of different types, for example, may be capacitors, inductors, or resistors. Alternatively, different second tuning elements may be tuning elements that are of a same type and that differ in specification and size. For example, all the tuning elements are inductors, but the tuning elements have different inductance values.

In this embodiment of this application, when the first switch connects to the different first tuning elements through switching, the second switch connects, through switching, to the second tuning element corresponding to the first tuning element that connects to the first switch, so that sizes of the first tuning element and the second tuning element that connect to the antenna body are changed, to change the electrical length between the feed point and the first end and the electrical length between the first end and the second end, so as to adjust the operating frequencies of the resonance of the first wavelength in the quarter wavelength mode and the resonance of the second wavelength in the half wavelength mode that are generated by the antenna body. In addition, the second tuning element that connects to the second switch corresponds to the first tuning element that connects to the first switch, and therefore the difference between the operating frequencies of the resonance of the first wavelength in the quarter wavelength mode and the resonance of the second wavelength in the half wavelength mode that are generated by the antenna body always range from 50 MHz to 200 MHz, to implement better compatibility between the resonance of the first wavelength in the quarter wavelength mode and the resonance of the second wavelength in the half wavelength mode. Therefore, the antenna can have good radiation performance both in the free space and in the handheld state.

In some embodiments, the first switch includes a plurality of first fixed ends and a first movable end that connects to the plurality of first fixed ends through switching, the first movable end connects to the first connection point, and each first fixed end connects to one first tuning element; and the second switch includes a plurality of second fixed ends and a second movable end that connects to the plurality of second fixed ends through switching, the second movable end connects to the second connection point, and each second fixed end connects to one second tuning element. In this embodiment of this application, the first movable end connects to different first fixed ends through switching, so that first tuning elements that connect to the different first fixed ends connect to the antenna body, and the second movable end connects to different second fixed ends through switching, so that second tuning elements that connect to the different second fixed ends connect to the antenna body.

In some embodiments, the first switch may be a single-pole multi-throw switch or a multi-pole multi-throw switch. When the first switch is a single-pole multi-throw switch, there is one first movable end, and the first movable end connects to the plurality of first fixed ends through switching. When the first switch is a multi-pole multi-throw switch, there are a plurality of first movable ends. In some embodiments, a quantity of first movable ends is the same as a quantity of first fixed ends, and a plurality of first movable ends are in a one-to-one correspondence with a plurality of first fixed ends. Each first movable end can connect to or be disconnected from a first fixed end corresponding to the first movable end.

The first tuning element or the second tuning element is obtained with any one or more of a capacitor, an inductor, and a resistor connected in parallel or connected in series.

In some embodiments, a third tuning element is connected between the grounding point and a grounding position of the grounding point, and the third tuning element is configured to adjust an electrical length of the antenna body. In this embodiment of this application, the third tuning element is connected between the grounding point and the grounding position, so that the electrical length between the first end and the second end and the electrical length between the feed point and the first end are changed, to adjust the resonance generated between the first end and the second end of the antenna body and the resonance generated between the feed point and the first end, so as to obtain a required resonance mode (for example, the resonance of the first wavelength in the quarter wavelength mode and the resonance of the second wavelength in the half wavelength mode in some embodiments of this application).

In some embodiments, a length of a first edge is greater than a length of a second edge, and a distance between a first slot and the second edge is greater than a distance between a second slot and the first edge.

In this embodiment of this application, the distance between the first slot and the second edge is greater than the distance between the second slot and the first edge. In other words, in some embodiments, the antenna body includes the first section and the second section that intersect with each other, the first section is a section between the first slot on the first edge and the second edge, and the second section is a section between the second slot on the second edge and the first edge. The second section that is of a relatively short length and that is of the antenna body is located on the second edge that is of a relatively short length and that is of a frame, and the first section that is of a relatively long length and that is of the antenna body is located on the first edge that is of a relatively long length and that is of the frame, and therefore more L-shaped antennas can be further arranged on the frame, to implement a relatively proper antenna arrangement on the frame.

In some embodiments, the distance between the first slot and the second edge is greater than or equal to 90 mm, to avoid, to some extent, a case in which the first slot is held when the electronic device is held by a hand. Therefore, the antenna can still have relatively good radiation performance in the handheld state.

In some embodiments, the feed point is located on the first edge. In some embodiments, a length of the first section of the antenna body is greater than a length of the second section of the antenna body, and therefore that the feed point is located on the first edge means that the antenna body is located on the first section. The length of the first section of the antenna body is greater than the length of the second section of the antenna body, and therefore in some embodiments, a physical length between the feed point and the first end is greater than a physical length between the feed point and the second end. Therefore, a case in which the electrical length between the feed point and the first end is greater than the electrical length between the feed point and the second end and the resonance of the first wavelength in the quarter wavelength mode can be generated between the feed point and the first end can be implemented by connecting only a relatively small tuning element or without connecting a tuning element between the feed point and the first end. In this way, manufacturing costs can be reduced.

According to a second aspect, this application provides an electronic device. The electronic device includes a conductive frame, a radio frequency front end, and the antenna. The frame includes a first edge and a second edge that intersects with the first edge. A first slot is disposed on the first edge, and a second slot is disposed on the second edge. A part that is of the frame and that is located between the first slot and the second slot forms an antenna body of the antenna. A section that is of the frame and that is between the first slot and the second edge is a first section of the antenna body, and a section that is of the frame and that is between the second slot and the first edge is a second section of the antenna body. The radio frequency front end connects to a feed point of the antenna body, and is configured to feed a radio frequency signal into the antenna body or receive a radio frequency signal transmitted from the antenna body. In some embodiments of this application, the first edge of the electronic device is in a vertical direction, and the second edge is in a horizontal direction. Alternatively, the first edge of the electronic device is in a horizontal direction, and the second edge is in a vertical direction.

In this embodiment of this application, the section that is of the frame and that is between the first slot and the second edge is the first section of the antenna body, the section that is of the frame and that is between the second slot and the first edge is the second section of the antenna body, excitation in the horizontal direction or excitation in the vertical direction can be generated based on resonance that is of a first wavelength in a quarter wavelength mode and that is of the antenna, and excitation in the horizontal direction and excitation in the vertical direction can be generated based on resonance that is of the second wavelength in a half wavelength mode and that is of the antenna, so that both horizontal mode excitation and vertical mode excitation of the antenna are relatively strong, and the horizontal mode excitation and the vertical mode excitation of the antenna are relatively balanced. Therefore, the antenna can have relatively good radiation performance regardless of whether the electronic device that includes the antenna is in free space (FS) or a handheld state. In addition, the part that is of the frame and that is between the first slot and the second slot is used as the antenna body, and therefore a size occupied by the antenna can be reduced, a structure of the electronic device can be simplified, and a manufacturing process can be simplified.

According to a third aspect, this application provides an electronic device. The electronic device includes an insulated frame, a radio frequency front end, and the antenna. The frame includes a first edge and a second edge that intersects with the first edge. A first section of the antenna is disposed abut to the first edge, and a second section of the antenna is disposed abut to the second edge. The radio frequency front end connects to a feed point of an antenna body, and is configured to feed a radio frequency signal into the antenna body or receive a radio frequency signal transmitted from the antenna body. In some embodiments of this application, the first edge of the electronic device is in a vertical direction, and the second edge is a horizontal direction. Alternatively, the first edge of the electronic device is in a horizontal direction, and the second edge is a vertical direction. In some embodiments of this application, the first edge of the electronic device is in the vertical direction, and the second edge is the horizontal direction. Alternatively, the first edge of the electronic device is in the horizontal direction, and the second edge is the vertical direction.

In this embodiment of this application, the first section of the antenna is disposed abut to the first edge, the second section of the antenna is disposed abut to the second edge, excitation in the horizontal direction or excitation in the vertical direction can be generated based on resonance that is of a first wavelength in a quarter wavelength mode and that is of the antenna, and excitation in the horizontal direction and excitation in the vertical direction can be generated based on resonance that is of the second wavelength in a half wavelength mode and that is of the antenna, so that both horizontal mode excitation and vertical mode excitation of the antenna are relatively strong, and the horizontal mode excitation and the vertical mode excitation of the antenna are relatively balanced. Therefore, the antenna can have relatively good radiation performance regardless of whether the electronic device that includes the antenna is in free space (FS) or a handheld state.

BRIEF DESCRIPTION OF DRAWINGS

To describe the structural features and functions of this application more clearly, the following describes this application in detail with reference to the accompanying drawings and specific embodiments.

DESCRIPTION OF EMBODIMENTS

The following clearly describes the technical solutions in embodiments of this application with reference to the accompanying drawings in the embodiments of this application.

This application provides an electronic device, and the electronic device includes an antenna for communicating with the outside. When the electronic device is in free space (FS) or a beside head and hand mode (including a beside head and hand left side mode and a beside head and hand right side mode), the antenna can achieve a relatively good working effect, to avoid impact on signal transmission of the antenna when the electronic device is held by a hand, and in particular, to avoid impact on transmission of a low-frequency (low band, LB) signal of the antenna when the electronic device is held by a hand. A frequency of the low-frequency signal of the antenna usually ranges from 699 MHz to 960 MHz. The electronic device may be a portable electronic apparatus or another appropriate electronic apparatus. For example, the electronic device may be a notebook computer, a tablet computer, a relatively small device such as a mobile phone, a watch, an accessory device, or another wearable or micro device, a cellular phone, or a media player.

Figure 1:
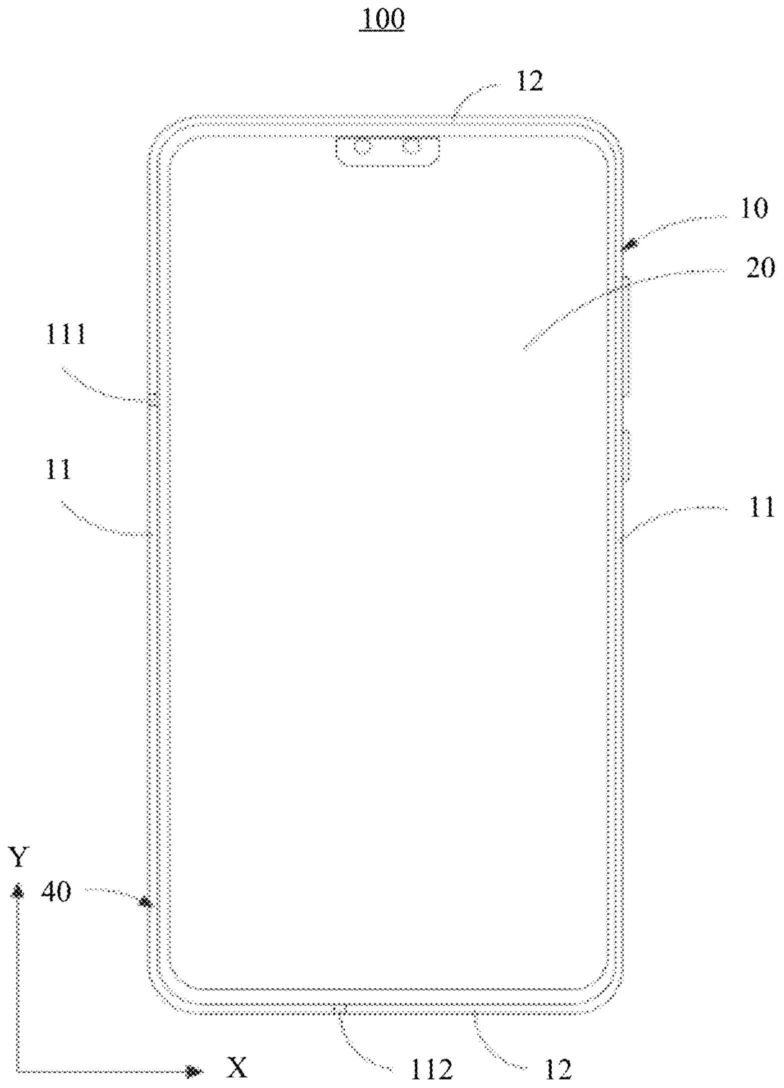
FIG. 1 is a schematic diagram of a structure of an electronic device according to an embodiment of this application.

FIG. 1 is a schematic diagram of a structure of an electronic device 100 according to an embodiment of this application. In this embodiment, the electronic device 100 is a mobile phone. The electronic device 100 includes a frame 10 and a display 20. The frame 10 is disposed around the display 20. The frame 10 includes two first edges 11 that are disposed opposite to each other and two second edges 12 that intersect with the two first edges 11. The two first edges 11 and the two second edges 12 are head-to-tail connected to form the frame 10 in a square shape. In this embodiment, the electronic device 100 is of a square tabular structure, that is, the frame 10 is in the square shape. In some embodiments, the frame 10 includes a chamfer, to present a more aesthetically pleasing effect for the frame 10. An extension direction of the second edge 12 is a horizontal direction (an X direction shown in the figure), and an extension direction of the first edge 11 is a vertical direction (a Y direction shown in the figure). In this embodiment, a length of the first edge 11 is greater than a length of the second edge 12. It may be understood that in some embodiments, the extension direction of the first edge 11 and the extension direction of the second edge 12 may be changed, and the length of the first edge 11 and the length of the second edge 12 may also be changed. This is not specifically limited herein. For example, in some embodiments, the extension direction of the first edge 11 may be the horizontal direction, and the extension direction of the second edge 12 may be the vertical direction. The length of the first edge 11 may be less than the length of the second edge 12. In this embodiment, the frame 10 may be made of a conductive material such as metal, or may be made of a non-conductive material such as plastic or resin.

The display 20 is configured to display an image, a video, and the like. The display 20 may be a flexible display or a rigid display. For example, the display 20 may be an organic light-emitting diode (OLED) display, an active-matrix organic light-emitting diode (AMOLED) display, a mini organic light-emitting diode display, a micro light-emitting diode display, a micro organic light-emitting diode display, a quantum dot light-emitting diode (QLED) display, or a liquid crystal display (LCD).

Figure 2:
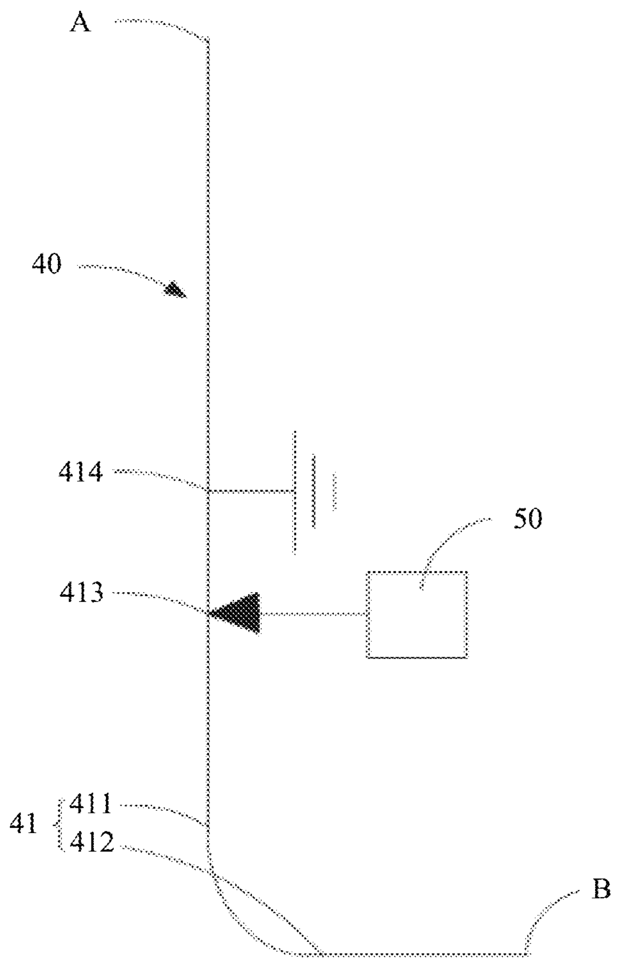
FIG. 2 is a schematic diagram of a structure of an antenna according to an embodiment of this application.

Referring to FIG. 2, the electronic device 100 further includes an antenna 40 and a radio frequency front end 50. The antenna 40 includes an antenna body 41. The antenna body 41 is configured to radiate a radio frequency signal to the outside or receive a radio frequency signal from the outside, so that the electronic device 100 can communicate with the outside by using the antenna body 41. The radio frequency front end 50 connects to the antenna body 41, and is configured to feed a radio frequency signal into the antenna body 41 or receive an external radio frequency signal received by the antenna body 41. In some embodiments, the radio frequency front end 50 includes a transmit channel and a receive channel. The transmit channel includes components such as a power amplifier and a filter. A signal is transmitted to the antenna body 41 after processing such as power amplification and filtering is performed by using components such as the power amplifier and the filter, and is transmitted to the outside by the antenna body 41. The receive channel includes components such as a low noise amplifier and a filter. An external signal received by the antenna body 41 is transmitted to a radio frequency chip after processing such as low noise amplification and filtering is performed by using components such as the low noise amplifier and the filter, to implement communication between the electronic device 100 and the outside by using the radio frequency front end 50 and the antenna 40.

The antenna body 41 is of an L-shaped structure, and includes a first section 411 and a second section 412 that intersects with the first section 411. An end that is of the first section 411 and that is far away from the second section 412 is a first end A, and an end that is of the second section 412 and that is far away from the first section 411 is a second end B. It should be emphasized that in some other embodiments of this application, the first end A and the second end B may be interchanged. In other words, in some embodiments, the end that is of the second section 412 and that is far away from the first section 411 is the first end A, and the end that is of the first section 411 and that is far away from the second section 412 is the second end B.

The antenna body 41 includes a feed point 413 and a grounding point 414 that are disposed with an interval. The grounding point 414 may be located between the feed point 413 and the first end A, or may be located between the feed point 413 and the second end B. The feed point 413 is configured to electrically connect to the radio frequency front end 50, so that a signal generated by the radio frequency front end 50 can be transmitted to the antenna body 41 through the feed point 413, and transmitted to the outside through the antenna body 41. Alternatively, the external signal received by the antenna body 41 is transmitted to the radio frequency front end 50 through the feed point 413. It should be noted that the feed point 413 in this application is not an actual point, and a position at which the radio frequency front end 50 connects to the antenna body 41 is the feed point 413 in this application.

The grounding point 414 is grounded, and an electrical length of the antenna body 41 can be adjusted by adjusting a position of the grounding point 414. A resonance frequency of the antenna body 41 can be changed if the electrical length is changed. In some embodiments, the grounding point 414 is grounded by using a grounding member such as a grounding pin or a grounding wire. One end of the grounding member connects to the grounding point 414 of the antenna body 41, and the other end is grounded, so that the grounding point 414 is grounded. It should be noted that the grounding point 414 in this application is not an actual point, and a position at which the grounding member such as the grounding pin or the grounding wire connects to the antenna body 41 is the grounding point 414.

It should be noted that the electrical length of the antenna body 41 in this application may be measured in a plurality of manners. For example, in some embodiments, the electrical length of the antenna body 41 may be measured by using a passive test method. Specifically, the antenna is manufactured into a jig, each of the first end A and the second end B of the antenna body 41 is sealed with a copper sheet, and changes of return loss diagrams of the antenna measured at different moments are observed, to determine an electrical length, of the antenna body 41, between the first end A and the second end B and an electrical length between the feed point 413 and the first end A or the second end B.

Figure 3:
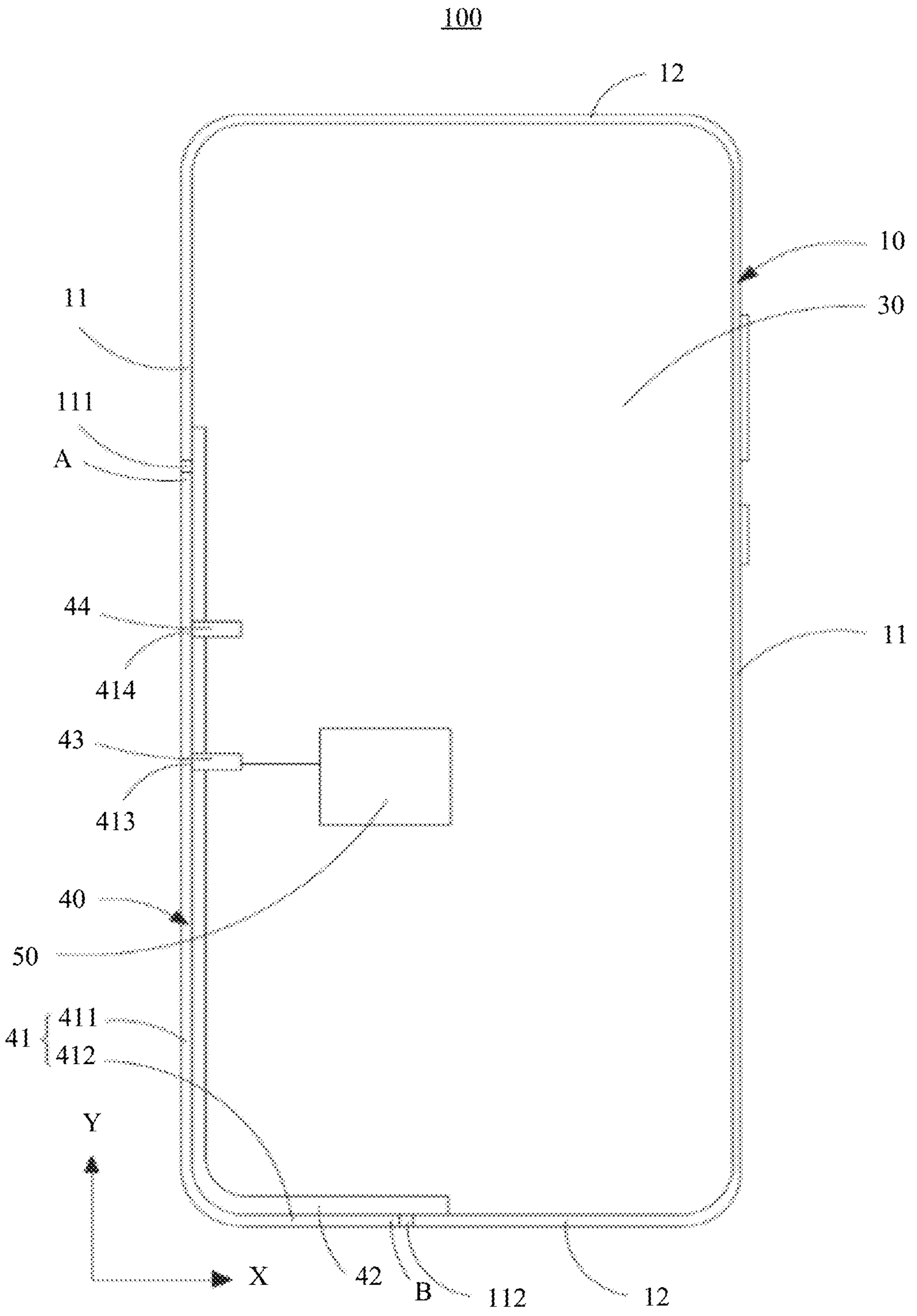
FIG. 3 is a schematic diagram of an internal structure of an electronic device according to an embodiment shown in FIG. 1 of this application.

FIG. 3 is a schematic diagram of an internal structure of the electronic device 100 shown in FIG. 1. The electronic device 100 further includes a middle frame 30. The display 20 is stacked with the middle frame 30, and the frame 10 is disposed around the middle frame 30. In this embodiment, the middle frame 30 is made of a conductive material (for example, a metal material) such as metal, and the middle frame 30 is grounded. When the frame 10 is made of a conductive material, at least a part of the frame 10 may electrically connect to the middle frame 30, to ground the frame 10 by using the middle frame 30. It may be understood that in some other embodiments of this application, the electronic device 100 may not include the middle frame 30, and the frame 10 may connect to another grounding position by using a grounding member, to implement grounding.

In some embodiments of this application, the frame 10 is made of a metal material, and some sections of the frame 10 can be used as the antenna body 41, to reduce space occupied by the antenna 40. In the embodiment shown in FIG. 3, a first slot 111 is disposed on one first edge 11, a second slot 121 is disposed on a second edge 12, and the frame 10 between the first slot 111 and the second slot 121 forms the antenna body 41 in this embodiment. A part that is of the first edge 11 and that is between the first slot 111 and the second edge 12 is the first section 411 of the antenna body 41, and a part that is of the second edge 12 and that is between the second slot 121 and the first edge 11 is the second section 412 of the antenna body 41. The antenna body 41 is electrically isolated from a part other than the antenna body 41 on the frame 10 by using the first slot 111 and the second slot 121. In addition, there is a gap 42 between the antenna body 41 and the middle frame 30, to ensure a good clearance environment for the antenna body 41, so that the antenna 40 has a good signal transmission function. In some embodiments, the part other than the antenna body 41 on the frame 10 may connect to the middle frame 30, and may be integrally formed with the middle frame 30. It may be understood that when the part other than the antenna body 41 on the frame 10 is used as an antenna body of another antenna (for example, a Wi-Fi antenna or a GPS antenna) of the electronic device, there is also a gap 42 between the part other than the antenna body on the frame 10 and the middle frame 30, to ensure a good clearance environment for the antenna.

The antenna body 41 includes the first end A and the second end B. In this embodiment, an end face of the first end A faces the first slot 111, and an end face of the second end B faces the second slot 121. In this case, the first end A is located in the vertical direction of the electronic device 100, and the second end B is located in the horizontal direction of the electronic device 100. It may be understood that when the extension direction of the first edge 11 of the antenna body 41 is the horizontal direction, and the extension direction of the second edge 12 is the vertical direction, the first end A whose end face faces the first slot 111 is located in the horizontal direction, and the second end B whose end face faces the second slot 121 is disposed in the vertical direction.

In this application, a distance between the first slot 111 and the second edge 12 and a distance between the second slot 121 and the first edge 11 are not specifically limited. In some embodiments, the distance between the first slot 111 and the second edge 12 or the distance between the second slot 121 and the first edge 11 is greater than 90 mm, to avoid, to some extent, a case in which the first slot 111 or the second slot 121 is held when the electronic device is held by a hand. Therefore, the antenna 40 can still have relatively good radiation performance in a handheld state.

In some embodiments, the length of the first edge 11 is greater than the length of the second edge 12, and the distance between the first slot 111 and the second edge 12 is greater than the distance between the second slot 121 and the first edge, that is, a length of the first section 411 is greater than a length of the second section 412. The second section 412 that is of a relatively short length and that is of the antenna body 41 is located on the second edge 12 that is of a relatively short length and that is of the frame 10, and the first section 411 that is of a relatively long length and that is of the antenna body 41 is located on the first edge 11 that is of a relatively long length and that is of the frame 10, and therefore more L-shaped antennas can be further arranged on the frame 10, to implement a relatively proper antenna arrangement on the frame 10.

In some embodiments, the first slot 111 and the second slot 121 may be filled with a dielectric material, to further enhance an electrical isolation effect between the antenna body 41 and a part other than the antenna body 41 on the frame 10.

Figure 4:
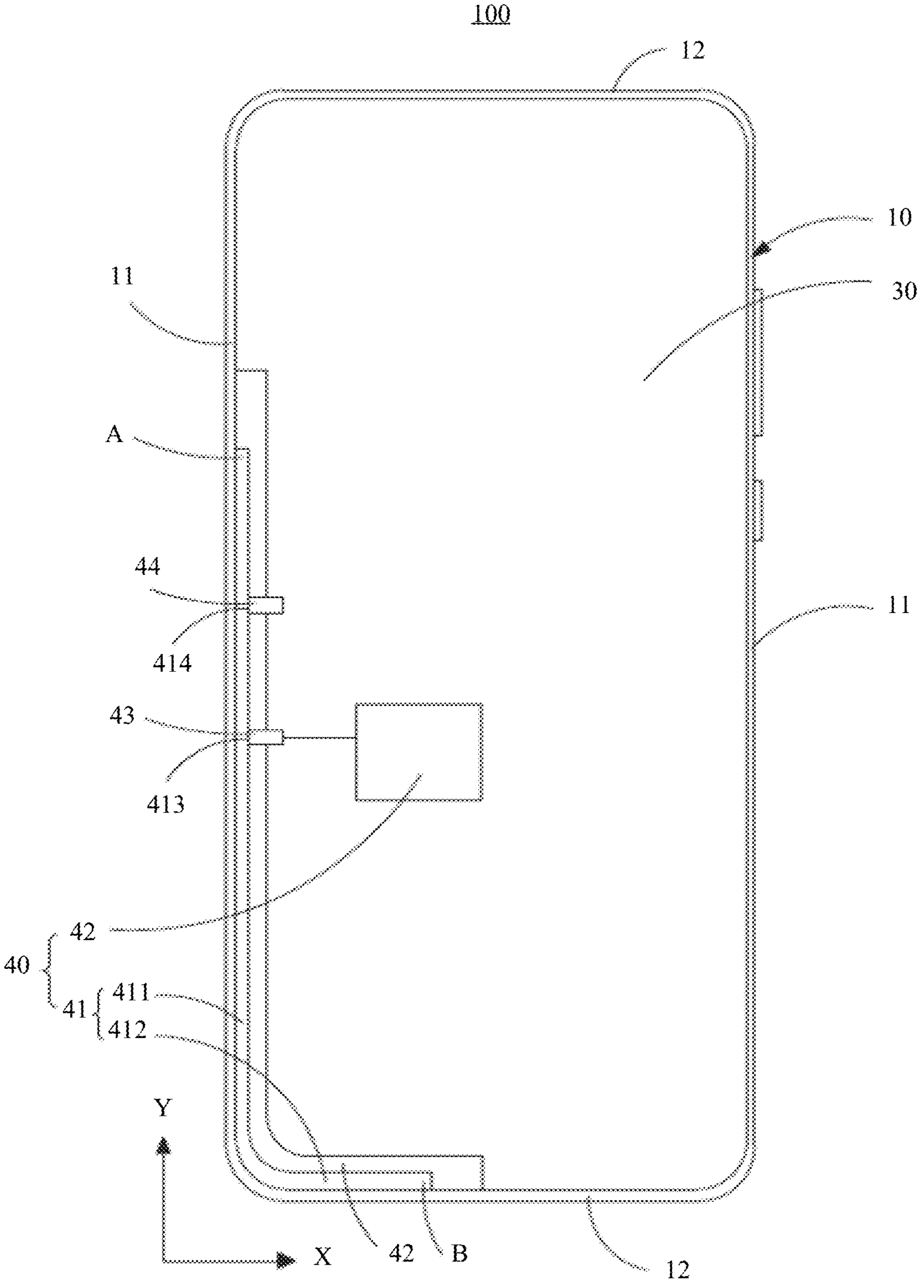
FIG. 4 is another schematic diagram of an internal structure of an electronic device.
Figure 5:
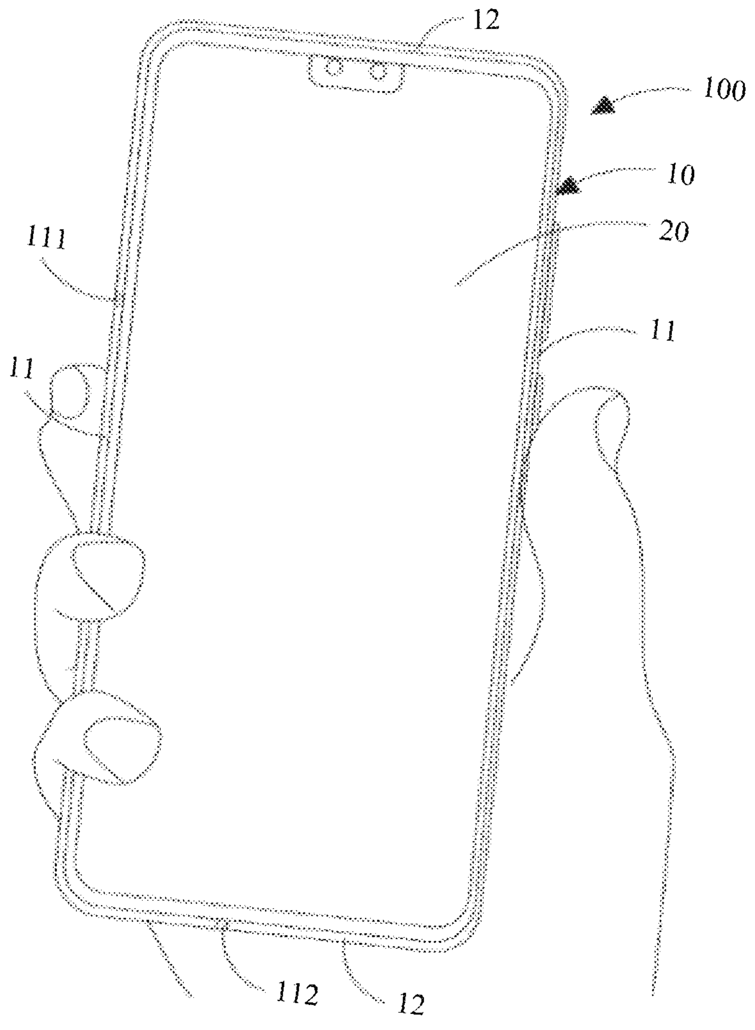
FIG. 5 is a schematic diagram of a handheld state of an electronic device, where the electronic device is in a portrait mode.

Referring to FIG. 4, in some embodiments, when the frame 10 of the electronic device 100 is made of a non-conductive material, the frame 10 cannot be used as the antenna body 41. A difference between this embodiment and the embodiment shown in FIG. 3 lies in that the antenna body 41 is located in the electronic device 100. In this embodiment, the antenna body 41 is disposed abut to the frame 10, to minimize a size occupied by the antenna 40 and enable the antenna 40 to be closer to the outside of the electronic device 100, so as to implement a better signal transmission effect. It should be noted that in this application, that the antenna body 41 is disposed abut to the frame 10 means that the antenna body 41 may be disposed in close contact with the frame 10, or may be disposed close to the frame 10, that is, there can be a small gap between the antenna body 41 and the frame 10. In this embodiment, the first slot 111 and the second slot 121 do not need to be disposed on the frame 10, and a radio frequency signal output or received by the antenna body 41 can be transmitted through the frame 10, to prevent the frame 10 from restricting signal transmission of the antenna 40. The antenna 40 may be in an antenna form of a flexible printed circuit (FPC), a laser direct structuring (LDS) antenna, a microstrip disk antenna (MDA), or the like.

In the embodiments shown in FIG. 3 and FIG. 4, the antenna body 41 connects to the middle frame 30 by using a grounding pin 44. The middle frame 30 is grounded, and therefore the grounding point 414 is grounded by using the grounding pin 44. Specifically, one end of the grounding pin 44 connects to the antenna body 41, and the other end connects to the middle frame 30. A position at which the grounding pin 44 connects to the antenna body 41 is the grounding point 414 of the antenna body 41. In the embodiments shown in FIG. 3 and FIG. 4, the antenna body 41 connects to the radio frequency front end 50 by using a feed pin 43. Specifically, one end of the feed pin 43 connects to the antenna body 41, and the other end connects to the radio frequency front end 50. A position at which the feed pin 43 connects to the antenna body 41 is the feed point 413 of the antenna body 41. It may be understood that in some other embodiments of this application, the antenna body 41 may connect to the middle frame 30 by using another structure such as a connection lead, or may connect to the radio frequency front end 50 by using another structure such as a connection lead. This is not specifically limited herein.

In some embodiments, an electrical length between the feed point 413 and the first end A is greater than an electrical length between the feed point 413 and the second end B, and the electrical length between the feed point 413 and the first end A is approximately a first wavelength in a quarter wavelength mode, so that resonance of the first wavelength in the quarter wavelength mode can be generated in a section between the feed point 413 and the first end A of the antenna body 41. When the antenna 40 works, mode excitation in a direction perpendicular to the first end A can be generated through excitation based on the resonance that is of the first wavelength in the quarter wavelength mode and that is generated in the section between the feed point 413 and the first end A of the antenna body 41. The first wavelength is an operating wavelength of the resonance of the first wavelength in the quarter wavelength mode. For example, in the embodiment shown in FIG. 3, when the extension direction of the first edge 11 is the vertical direction (the Y direction in the figure), the end face of the first end A faces the first slot 111 on the first edge 11, that is, the first end A is located in the vertical direction. In this case, horizontal mode excitation is generated through excitation based on the resonance that is of the first wavelength in the quarter wavelength mode and that is generated between the feed point 413 and the first end A of the antenna body 41. In some embodiments, when the extension direction of the first edge 11 is the horizontal direction (the X direction in the figure), the end face of the first end A faces the first slot 111 on the first edge 11, that is, the first end A is located in the horizontal direction. In this case, vertical mode excitation is generated through excitation based on the resonance that is of the first wavelength in the quarter wavelength mode and that is generated in the section between the feed point 413 and the first end A.

In this embodiment of this application, the electrical length between the feed point 413 and the first end A is greater than the electrical length between the feed point 413 and the second end B, and therefore it is set that a section (namely, the section between the feed point 413 and the first end A) of a relatively long electrical length is of approximately the first wavelength in the quarter wavelength mode, to generate the resonance of the first wavelength in the quarter wavelength mode, so that the resonance of the first wavelength in the quarter wavelength mode can have a relatively large radiation aperture. Therefore, the antenna 40 has relatively good radiation performance.

In this embodiment of this application, the feed point 413 may be disposed at any position of the antenna body 41. Specifically, a position of the feed point 413 or a position of the first end A may be correspondingly changed based on a specific actual situation of the electronic device 100, to control a direction in which mode excitation is to be generated. For example, when the electronic device 100 shown in FIG. 3 is designed with a narrow chin structure, there is relatively small clearance space on a bottom edge (an edge that extends in a direction of an X axis in FIG. 3) of the electronic device 100. When there is a relatively good clearance environment on a side edge (an edge that extends in the Y direction in FIG. 3) of the electronic device 100, the first edge 11 of the frame 10 may be disposed at a position on the side edge of the electronic device, so that the extension direction of the first edge 11 is the Y direction, and the first end A is located in the vertical direction, to obtain horizontal mode excitation. When there is a poor clearance environment on the side edge of the electronic device 100, and there is a relatively good clearance environment on the bottom edge, the first edge 11 of the frame 10 may be disposed at a position on the bottom edge of the electronic device, so that the extension direction of the first edge 11 is the X direction, and the first end A is located in the horizontal direction, to obtain vertical mode excitation. In this embodiment, the extension direction of the first edge 11 is the Y direction, and the first end A is located in the vertical direction. The feed point 413 is located in the first section 411 of the antenna body 41. In this embodiment, the length of the first section 411 of the antenna body 41 is greater than the length of the second section 412, and therefore when the feed point 413 is disposed in the first section 411, a physical length between the feed point 413 and the first end A is usually greater than a physical length between the feed point 413 and the second end B. Therefore, a case in which the electrical length between the feed point 413 and the first end A is greater than the electrical length between the feed point 413 and the second end B and the resonance of the first wavelength in the quarter wavelength mode can be generated between the feed point 413 and the first end A can be implemented by connecting only a tuning element with a relatively small specification or without connecting a tuning element between the feed point 413 and the first end A. In this way, manufacturing costs can be reduced.

In some embodiments of this application, the electrical length between the first end A and the second end B is approximately a second wavelength in a half wavelength mode, and the antenna body 41 can generate resonance of the second wavelength in the half wavelength mode between the first end A and the second end B. The second wavelength is a wavelength of the resonance that is of the second wavelength in the half wavelength mode and that is formed between the first end A and the second end B. In some embodiments, the first wavelength and the second wavelength are operating wavelengths of signals whose radiation frequencies fall within a same frequency band (for example, B28, B5, or B8) in an LTE standard. The antenna body 41 is L-shaped, and therefore mode excitation in a direction perpendicular to the first section 411 and mode excitation in a direction perpendicular to the second section 412 can be generated, that is, horizontal mode excitation and vertical mode excitation can be generated, which can assist in enhancing the mode excitation generated based on the resonance of the first wavelength in the quarter wavelength mode, so that horizontal mode excitation and vertical mode excitation of the antenna 40 can be relatively strong, that is, both the horizontal mode excitation and the vertical mode excitation of the antenna can be relatively balanced. Therefore, the antenna 40 still has relatively good antenna radiation performance in the handheld state. In other words, in this application, the antenna body 41 can generate both the resonance of the first wavelength in the quarter wavelength mode and the resonance of the second wavelength in the half wavelength mode, and the mode excitation generated based on the resonance of the first wavelength in the quarter wavelength mode can be enhanced by using the resonance of the second wavelength in the half wavelength mode, so that the horizontal mode excitation and the vertical mode excitation of the antenna 40 are relatively balanced. Therefore, the antenna 40 can have relatively good radiation performance regardless of whether the electronic device 100 is in free space (FS) or in the handheld state. For example, in the embodiment in FIG. 3, horizontal mode excitation is generated based on the resonance of the first wavelength in the quarter wavelength mode, and horizontal mode excitation and vertical mode excitation are generated based on the resonance of the second wavelength in the half wavelength mode, so that when the electronic device 100 is in the free space, both the horizontal mode excitation and the vertical mode excitation are relatively strong. Therefore, the antenna 40 has relatively good radiation performance. When the electronic device 100 is held by a hand and the electronic device 100 is in a portrait mode, holding of the first edge 11 of the electronic device 100 partially affects a magnitude of mode excitation of the electronic device 100 in the horizontal direction, but does not affect intensity of vertical mode excitation. Therefore, the antenna 40 still has good radiation performance. When the electronic device 100 is held by a hand and the electronic device 100 is in a landscape mode, holding of the second edge 12 of the electronic device 100 partially affects a magnitude of mode excitation of the electronic device 100 in the vertical direction, but does not affect intensity of horizontal mode excitation. Therefore, the antenna 40 still has good radiation performance.

In this application, when the antenna 40 works, the resonance of the first wavelength in the quarter wavelength mode and the resonance of the second wavelength in the half wavelength mode are generated. In some embodiments, the first wavelength is greater than the second wavelength, that is, a frequency of the resonance of the first wavelength in the quarter wavelength mode is less than a frequency of the resonance of the second wavelength in the half wavelength mode, to avoid generating an efficiency pit at a same operating frequency band (for example, a frequency band B28, B5, or B8), so that the antenna 40 can have good radiation performance at the operating frequency band.

In some embodiments, a difference between the frequency of the resonance generated between the feed point and the first end and the frequency of the resonance generated between the first end and the second end ranges from 50 MHz to 200 MHz, to implement better compatibility between the resonance of the first wavelength in the quarter wavelength mode and the resonance of the second wavelength in the half wavelength mode. Therefore, the antenna can have good radiation performance both in the free space and in the handheld state. In some embodiments, the difference between the frequency of the resonance of the first wavelength in the quarter wavelength mode and the frequency of the resonance of the second wavelength in the half wavelength mode may range from 50 MHz to 150 MHz.

Figure 6:
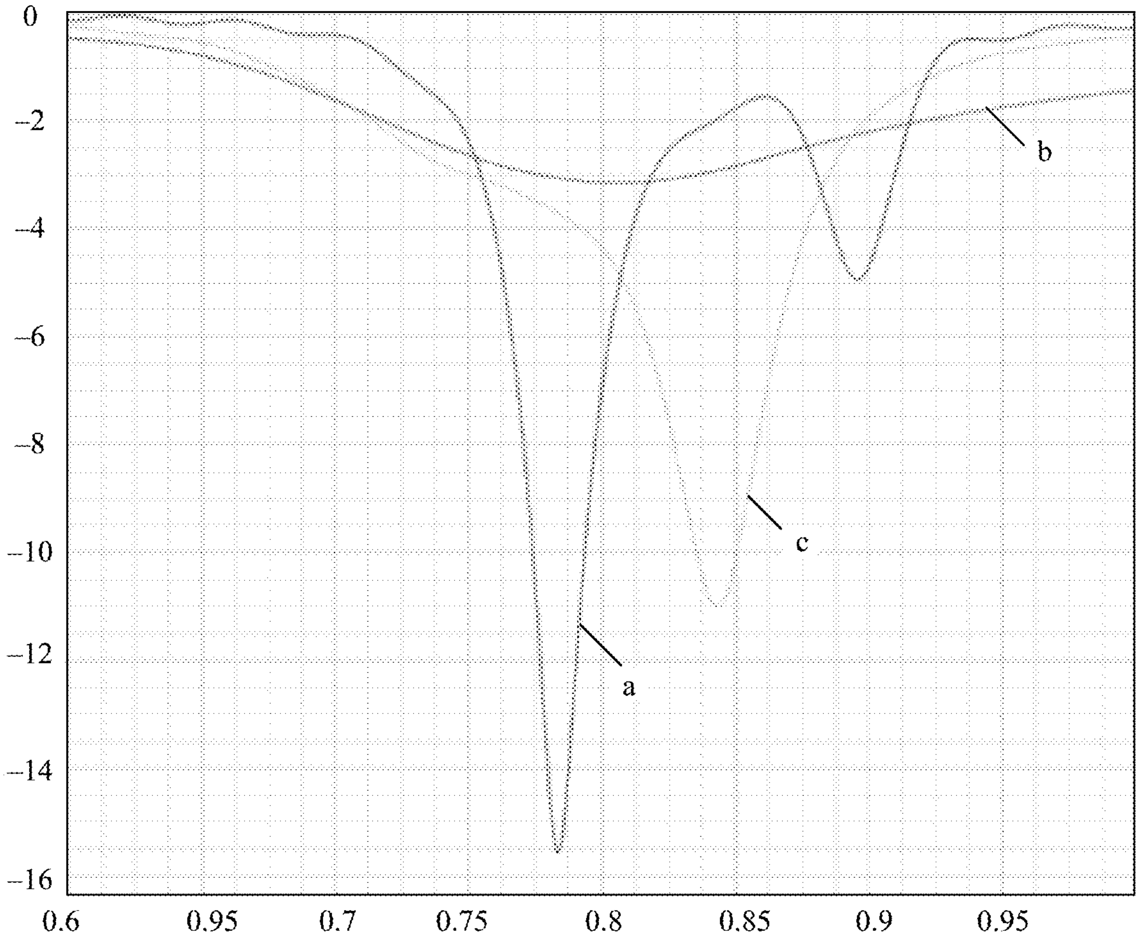
FIG. 6 is a diagram of curves of a return loss coefficient (S11) of an antenna of the electronic device shown in FIG. 3 in different statuses.
Figure 7:
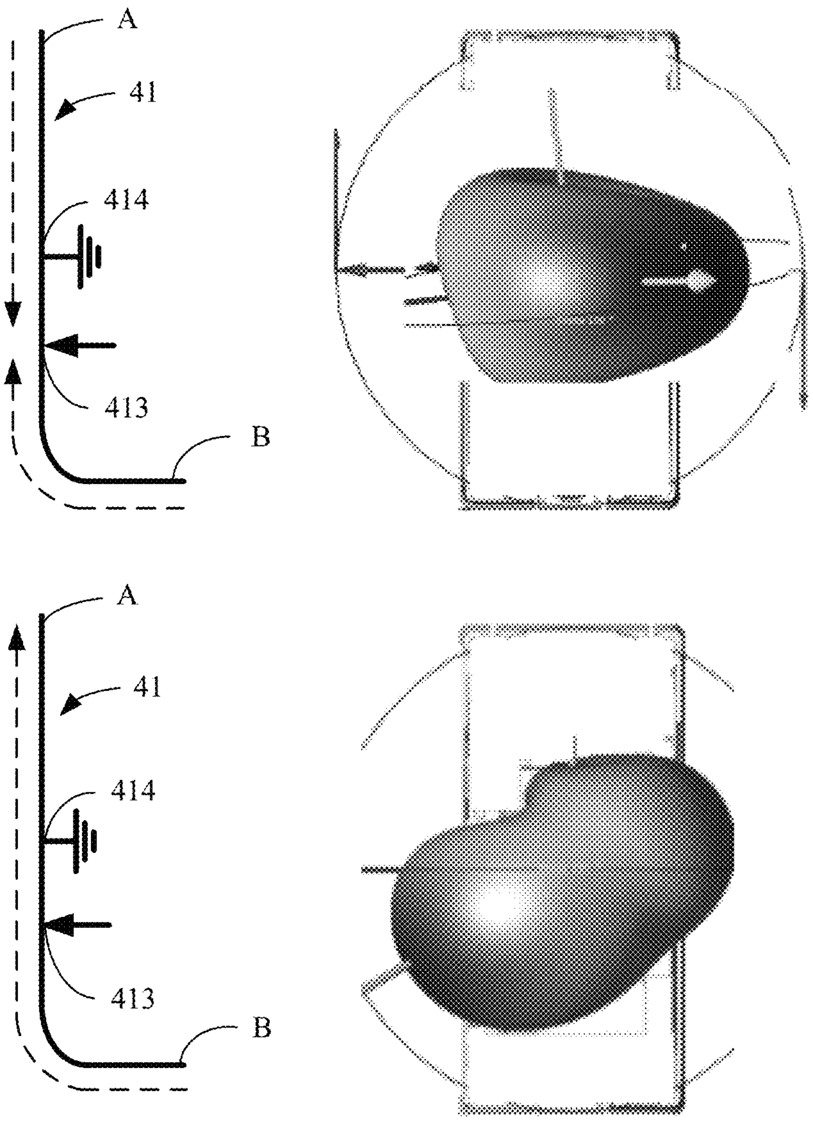
FIG. 7 is a simulation diagram of a current and radiation direction existing when an antenna of the electronic device shown in FIG. 3 is in free space.
Figure 8:
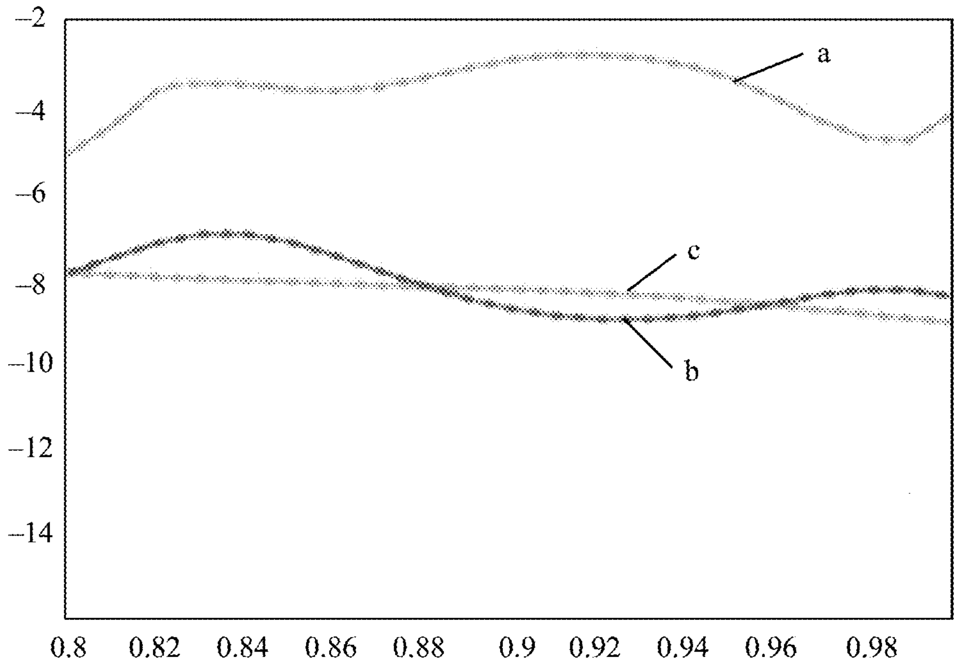
FIG. 8 is a diagram of radiation efficiency of an antenna of the electronic device shown in FIG. 3.

Refer to FIG. 5 to FIG. 8. FIG. 6 is a diagram of curves of a return loss coefficient (S11) of the antenna 40 of the electronic device 100 shown in FIG. 3 in different statuses (including the free space, a beside head and hand left side mode, and a beside head and hand right side mode). In the embodiment shown in FIG. 3, the first end A is located on the first edge 11 of the frame 10, and the first edge 11 is located in the vertical direction. In FIG. 6, a horizontal coordinate is a frequency (unit: GHz), and a vertical coordinate is the return loss coefficient (unit: dB). A curve a represents a curve diagram of the return loss coefficient of the antenna 40 that exists when the electronic device 100 is in the free space. Curves b and c are curve diagrams of the return loss coefficient of the antenna 40 that exists when the electronic device 100 is held by a hand and the electronic device 100 is held in the portrait mode (a handheld state shown in FIG. 5). The curve b represents a curve diagram of the return loss coefficient of the antenna 40 that exists when the electronic device 100 is in the beside head and hand left side mode (namely, a mode in which the electronic device 100 is held by a left hand and is close to a left side of the face). The curve c represents a curve diagram of the return loss coefficient of the antenna 40 that exists when the electronic device 100 is in the beside head and hand right side mode (namely, a mode in which the electronic device 100 is held by a right hand and is close to a right side of the face). FIG. 7 is a simulation diagram of a current and radiation direction existing when the antenna 40 of the electronic device 100 shown in FIG. 3 is in the free space. FIG. 8 is a diagram of radiation efficiency of the antenna 40 of an example structure of the electronic device 100 shown in FIG. 3. In FIG. 8, a horizontal coordinate is a frequency (unit: GHz), and a vertical coordinate is the radiation efficiency (unit: dB). A curve a represents a curve diagram of radiation efficiency of the antenna 40 that exists when the electronic device 100 is in the free space. A curve b represents a curve diagram of radiation efficiency of the antenna 40 that exists when the electronic device 100 is in the beside head and hand left side mode (namely, a mode in which the electronic device 100 is held by the left hand and is close to the left side of the face). A curve c represents a curve diagram of radiation efficiency of the antenna 40 that exists when the electronic device 100 is in the beside head and hand right side mode (namely, a mode in which the electronic device 100 is held by the right hand and is close to the right side of the face).

It may be easily learned from FIG. 6 and FIG. 7 that the antenna 40 has two antenna modes in the free space, and therefore the antenna 40 has relatively high bandwidth. In addition, directivity patterns of the two antenna modes are complementary in specific space, so that the antenna 40 can have relatively good radiation efficiency in each direction, and a case in which the antenna 40 encounters a death grip when the electronic device 100 is held by a hand is avoided. In some embodiments, a directivity pattern obtained after complementation is oblique, and therefore there is no problem of death grip. In addition, it may be further learned from FIG. 6 and FIG. 8 that in both the beside head and hand left side mode and the beside head and hand right side mode, radiation performance of the antenna 40 is slightly reduced, but the antenna 40 does not encounter a death grip. It may be learned from FIG. 8 that there is a reduction of approximately 5 dB in the radiation efficiency of the antenna 40 when the radiation efficiency in the beside head and hand mode (including the beside head and hand left side mode or the beside head and hand right side mode) is compared with that in the free space, but the antenna 40 still has relatively good radiation efficiency.

Figure 9:
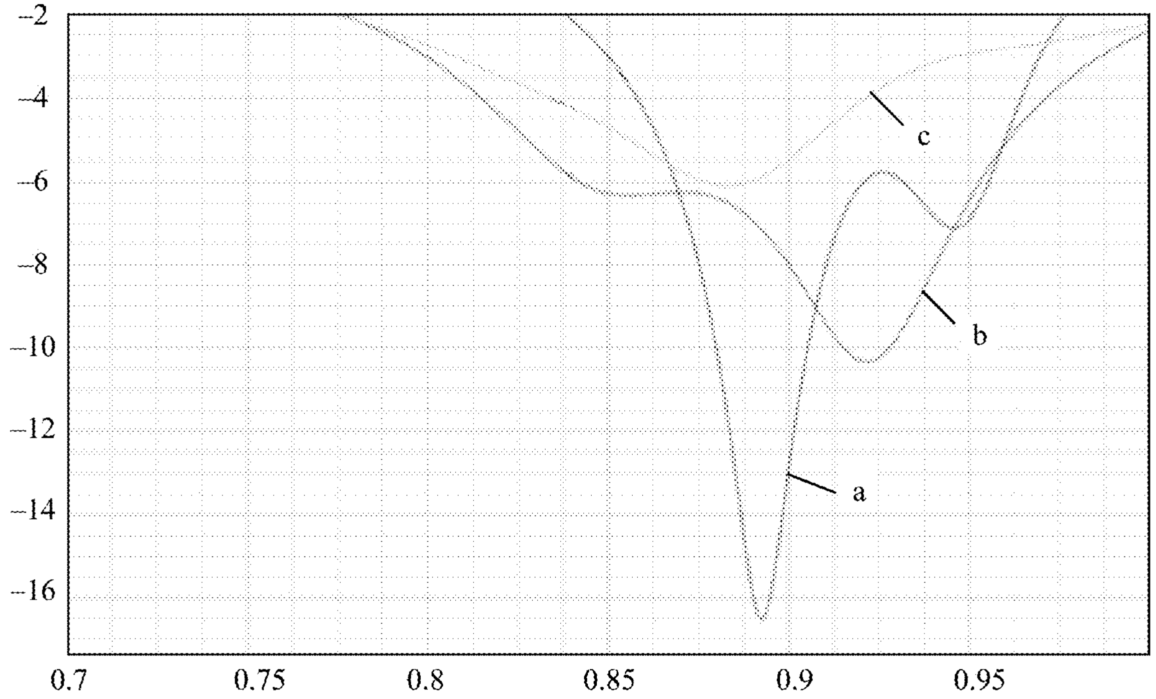
FIG. 9 is another diagram of a curve of a return loss coefficient (S11) of an antenna of an electronic device according to this application.
Figure 10:
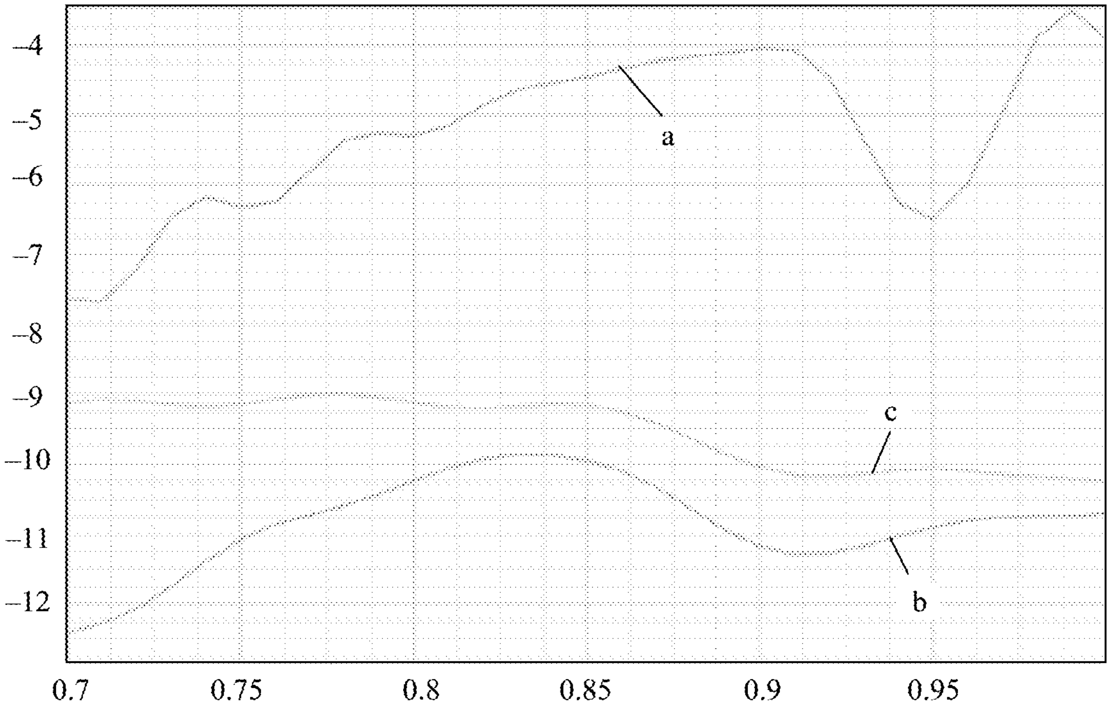
FIG. 10 is a diagram of system efficiency of the antenna represented in FIG. 9.

In some embodiments, when the first end A of the antenna 40 is located on the second edge 12 of the frame 10, the antenna 40 can still have relatively good radiation performance in the free space and the beside head and hand mode. Refer to FIG. 9 and FIG. 10. FIG. 9 is another diagram of a curve of a return loss coefficient (S11) of the antenna 40 of an example structure of the electronic device 100 according to this application. The first end A of the antenna 40 represented in FIG. 9 is located on the second edge 12 of the frame 10 of the electronic device 100. In FIG. 9, a horizontal coordinate is a frequency (unit: GHz), and a vertical coordinate is the return loss coefficient (unit: dB). A curve a represents a curve diagram of the return loss coefficient of the antenna 40 that exists when the electronic device 100 is in the free space. Curves b and c are curve diagrams of the return loss coefficient of the antenna 40 that exists when the electronic device 100 is held by a hand and the electronic device 100 is in the portrait mode. The curve b represents a curve diagram of the return loss coefficient of the antenna 40 that exists when the electronic device 100 is in the beside head and hand left side mode (namely, a mode in which the electronic device 100 is held by a left hand and is close to a left side of the face). The curve c represents a curve diagram of the return loss coefficient of the antenna 40 that exists when the electronic device 100 is in the beside head and hand right side mode (namely, a mode in which the electronic device 100 is held by a right hand and is close to a right side of the face). FIG. 10 is a diagram of system efficiency of the antenna 40 represented in FIG. 9. In FIG. 10, a horizontal coordinate is a frequency (unit: GHz), and a vertical coordinate is radiation efficiency (unit: dB).

It may be learned from FIG. 9 and FIG. 10 that when the first end A is located on the second edge 12 of the frame 10, the antenna 40 has two antenna modes in the free space, and therefore the antenna 40 has relatively high bandwidth. In addition, in both the beside head and hand left side mode and the beside head and hand right side mode, radiation performance of the antenna 40 is slightly reduced, but the antenna 40 does not encounter a death grip. Furthermore, there is a reduction in the radiation efficiency of the antenna 40 when the radiation efficiency in the beside head and hand mode (including the beside head and hand left side mode or the beside head and hand right side mode) is compared with that in the free space, but the antenna 40 still has relatively good radiation efficiency.

Figure 11:
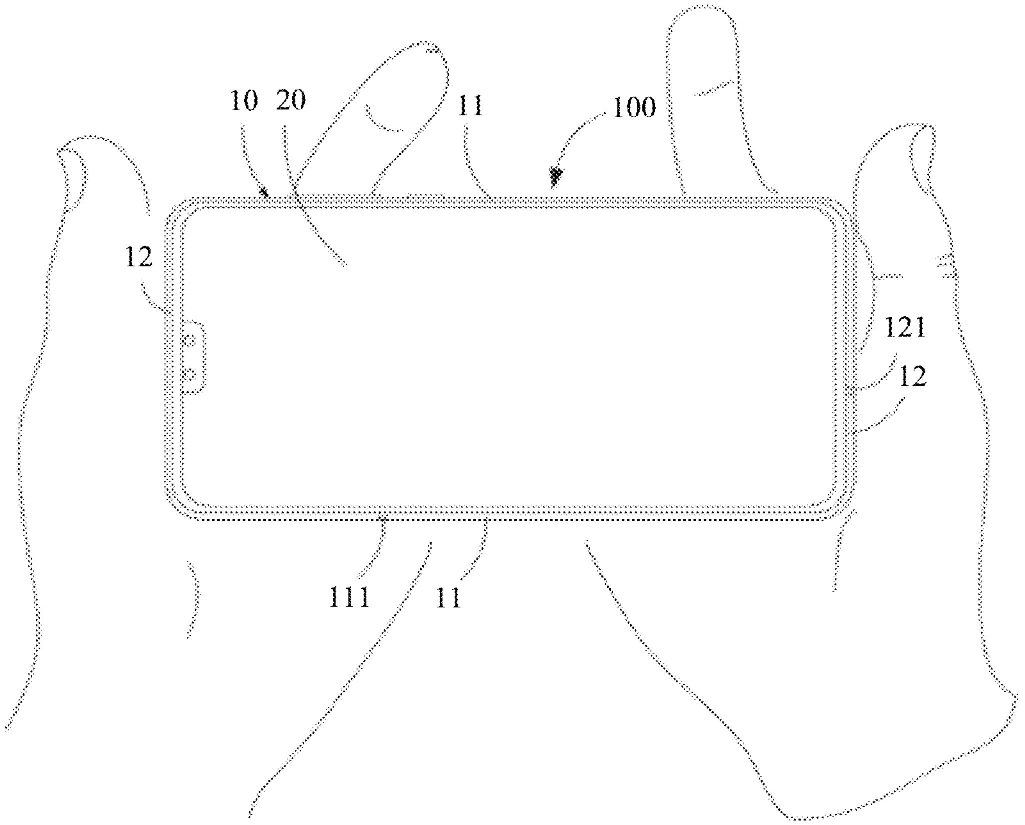
FIG. 11 is a schematic diagram of another handheld state of an electronic device, where the electronic device is in a landscape mode.
Figure 12:
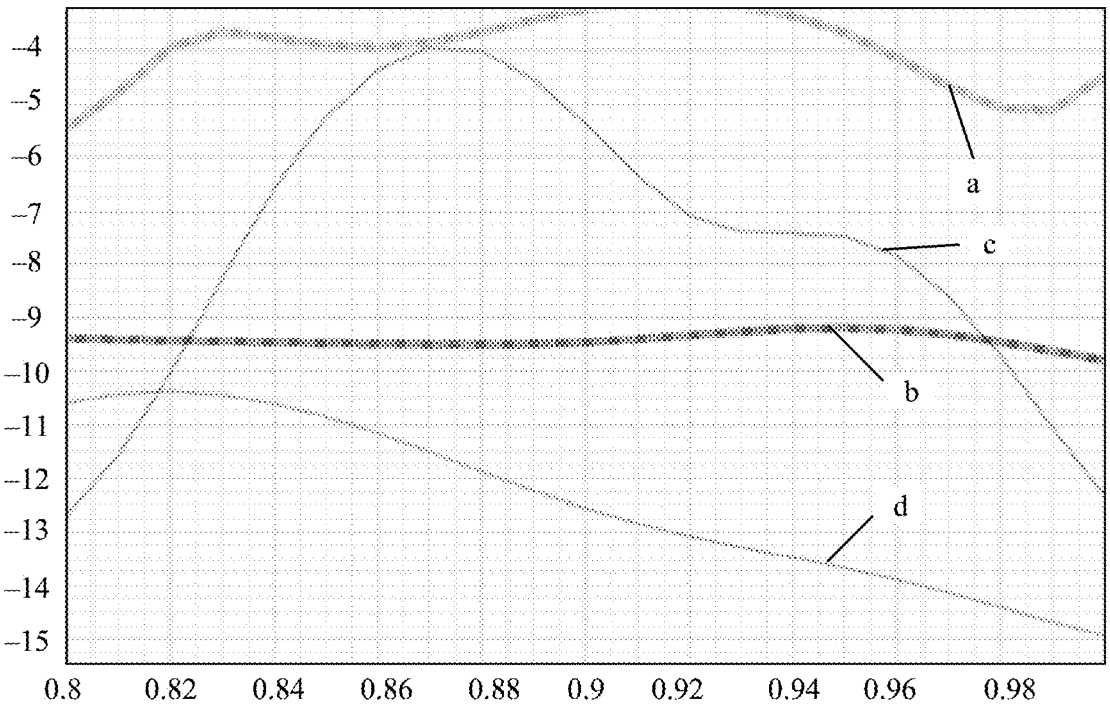
FIG. 12 is a diagram of system efficiency and radiation efficiency existing when an antenna of an example structure of the electronic device shown in FIG. 3 is in free space and a handheld state.

Refer to FIG. 11 and FIG. 12. FIG. 12 is a diagram of system efficiency and radiation efficiency existing when the antenna 40 of an example structure of the electronic device 100 shown in FIG. 3 is in the free space and the handheld state. When the electronic device is held by a hand, the electronic device is in a landscape mode shown in FIG. 11. In this case, the second edge 12 of the electronic device 100 is held by a hand. In FIG. 12, a horizontal coordinate is a frequency (unit: GHz), and a vertical coordinate is efficiency (unit: dB). A curve a represents a curve diagram of radiation efficiency of the antenna 40 that exists when the electronic device 100 is in the free space. A curve b represents a curve diagram of radiation efficiency of the antenna 40 that exists when the electronic device 100 is in the landscape mode and the second edge 12 of the electronic device 100 is held by a hand. A curve c represents a curve diagram of system efficiency of the antenna 40 that exists when the electronic device 100 is in the free space. A curve d represents a curve diagram of system efficiency of the antenna 40 that exists when the electronic device 100 is in the landscape mode and the second edge 12 of the electronic device 100 is held by a hand. It may be learned from the curves c and d that when the electronic device 100 is in the landscape mode, the antenna 40 does not encounter a death grip when the two opposite second edges 12 of the electronic device 100 are held by a hand. In addition, it may be learned from the curves a and b that there is a reduction of approximately 5 dB in the radiation efficiency of the antenna 40 when the radiation efficiency that exists when the electronic device 100 is in the handheld state is compared with that in the free space, but the antenna 40 still has relatively good radiation efficiency.

Figure 13:
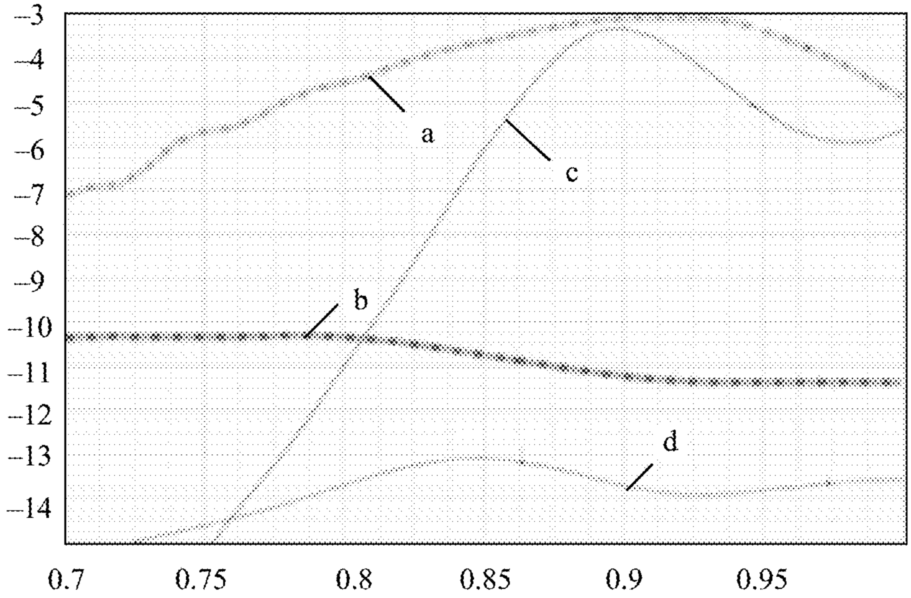
FIG. 13 is a diagram of system efficiency and radiation efficiency of an antenna of the electronic device shown in FIG. 3 in different statuses.

For example, FIG. 13 is a diagram of system efficiency and radiation efficiency of the antenna 40 of the electronic device 100 shown in FIG. 3 in different statuses. In FIG. 13, a horizontal coordinate is a frequency (unit: GHz), and a vertical coordinate is efficiency (unit: dB). A curve a represents a curve diagram of radiation efficiency of the antenna 40 that exists when the electronic device 100 is in the free space. A curve b represents a curve diagram of radiation efficiency of the antenna 40 that exists when the electronic device 100 is held by a hand and the first slot 111 and the second slot 121 of the frame 10 are blocked. A curve c represents a curve diagram of system efficiency of the antenna 40 that exists when the electronic device 100 is in the free space. A curve d represents a curve diagram of system efficiency of the antenna 40 that exists when the electronic device 100 is held by a hand and the first slot 111 and the second slot 121 of the frame 10 are blocked. It may be learned from the curves c and d that when the electronic device 100 is held by a hand and the first slot 111 and the second slot 121 of the frame 10 are blocked, the antenna 40 does not encounter a death grip. In addition, it may be learned from the curves a and b that there is a reduction of approximately 7 dB in the radiation efficiency of the antenna 40 when the radiation efficiency that exists when the electronic device 100 is in the handheld state and the first slot 111 and the second slot 121 of the frame 10 are blocked is compared with that in the free space, but the antenna 40 still has relatively good radiation efficiency.

Figure 14:
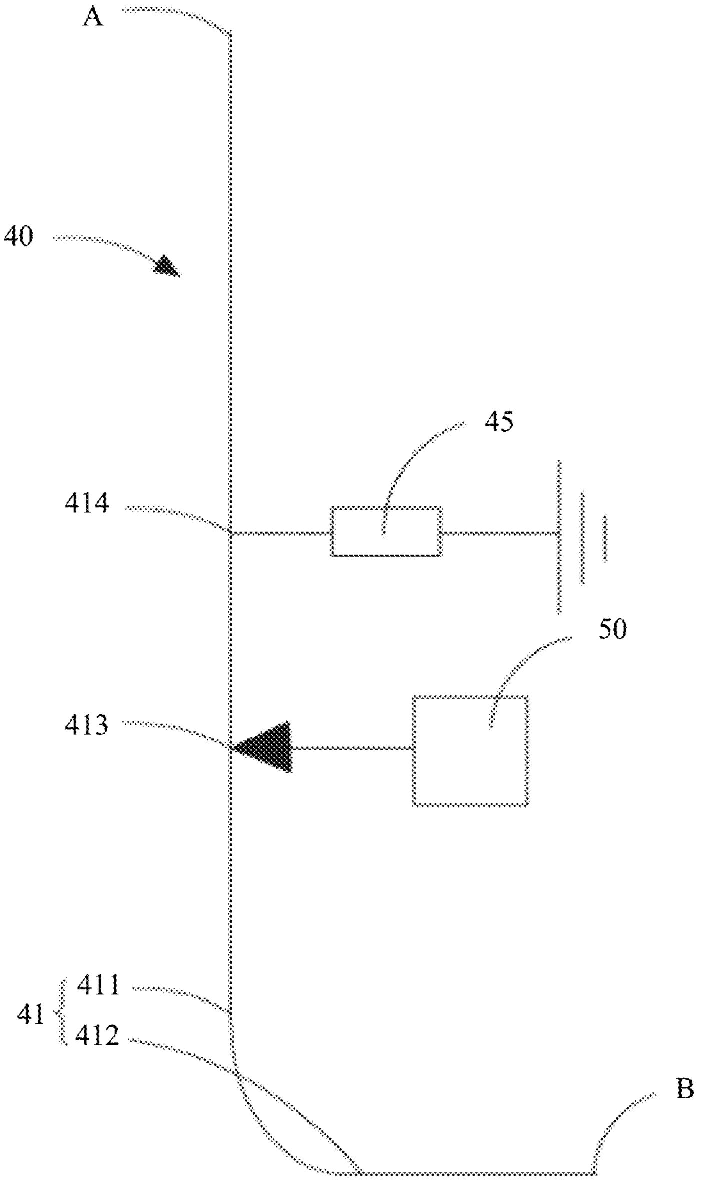
FIG. 14 is a schematic diagram of a structure of an antenna according to another embodiment.

FIG. 14 is a schematic diagram of a structure of the antenna 40 according to some other embodiments of this application. A difference between the antenna 40 in the embodiment shown in FIG. 14 and that in the embodiment shown in FIG. 2 lies in that a third tuning element 45 is connected between the grounding point 414 of the antenna body 41 and a grounding position. In this embodiment, the third tuning element 45 may be a capacitor or an inductor, or may be obtained with a capacitor and an inductor disposed in parallel or disposed in series. The third tuning element 45 is connected between the grounding point 414 and the grounding position, to change the electrical length, of the antenna body 41, between the first end A and the second end B and the electrical length, of the antenna body 41, between the feed point 413 and the first end A or the second end B, so as to adjust an operating frequency of an antenna mode generated based on resonance of the antenna body 41. In this embodiment, the grounding position is a position at which the grounding pin 44 connects to one end of the middle frame 30.

Figure 15A:
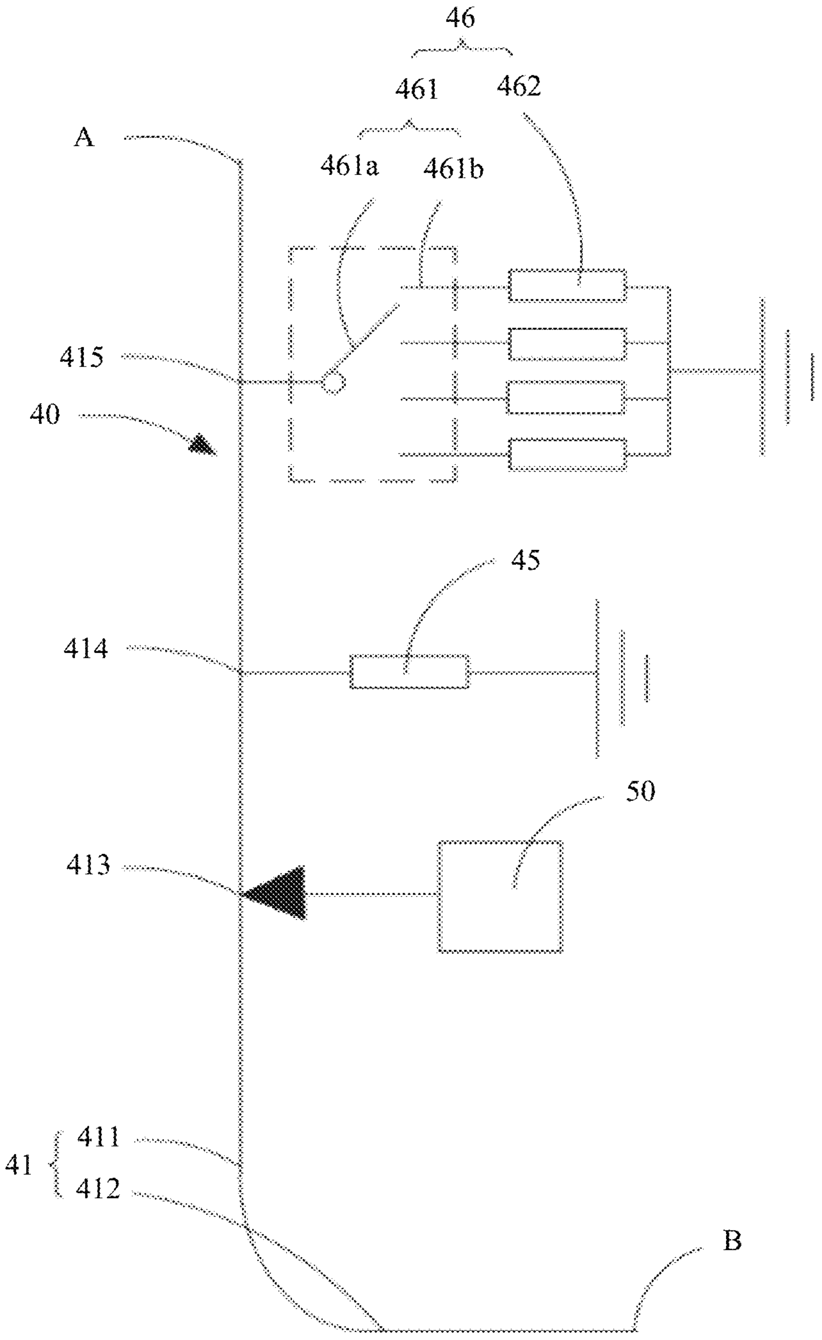
FIG. 15*a* is a schematic diagram of a structure of an antenna according to another embodiment.

In some embodiments of this application, the antenna 40 further includes at least one switching circuit. The antenna 40 switches to different operating frequency bands by using the switching circuit, so that the antenna 40 can implement communication at a plurality of different operating frequency bands. FIG. 15*a* is a schematic diagram of a structure of the antenna 40 according to some other embodiments of this application. A difference between the antenna 40 in the embodiment shown in FIG. 15*a* and that in the embodiment shown in FIG. 3 lies in that the antenna 40 further includes a first switching circuit 46. A first connection point 415 is disposed on the antenna body 41, and the first connection point 415 is located on a side that is of the feed point 413 and the grounding point 414 and that is far away from the first end A or on a side that is of the feed point 413 and the grounding point 414 and that is far away from the second end B. It should be noted that in this application, the first connection point 415 is not an actual point, and a position at which the first switching circuit 46 connects to the antenna body 41 is the first connection point 415. The first switching circuit 46 includes a first switch 461 and at least one grounded first tuning element 462. The first tuning element 462 may be a capacitive element or an inductive element, or may be obtained with capacitive or inductive elements connected in parallel or connected in series. At least one means one or more. The capacitive or inductive elements connected in parallel or in series mean that the first tuning element 462 may be obtained with a plurality of capacitive elements disposed in parallel or disposed in series, may be obtained with a plurality of inductive elements connected in parallel or connected in series, or may be obtained with a capacitive element and an inductive element connected in parallel or connected in series. One end of the first switch 461 connects to the first connection point 415, and the other end may connect to different first tuning elements 462 through switching, to connect different first tuning elements 462 (which may be first tuning elements 462 of different types, or may be first tuning elements 462 that are of a same type and that differ in specification and size) to the antenna body 41. In this embodiment, the first connection point 415 is located on the side that is of the feed point 413 and the grounding point 414 and that is far away from the second end B, to change the electrical length between the feed point 413 and the first end A and the electrical length (the electrical length between the first end A and the second end B) of the antenna body 41, so as to change the frequency of the resonance of the first wavelength in the quarter wavelength mode and the frequency of the resonance of the second wavelength in the half wavelength mode, so that the antenna 40 can cover different operating frequency bands. In some embodiments, the first connection point 415 may be alternatively located on the side that is of the feed point 413 and the grounding point 414 and that is far away from the first end A, to change the electrical length between the feed point 413 and the second end B and the electrical length between the first end A and the second end B, so as to change the frequency of the resonance of the second wavelength in the half wavelength mode.

The first switch 461 may be various types of switches. For example, the first switch 461 may be a physical switch such as a single-pole single-throw switch, a single-pole multi-throw switch, or a multi-pole multi-throw switch, or may be a switchable interface such as a mobile industry processor interface (MIPI) or a general-purpose input/output (GPIO) interface. The first switch 461 includes a first movable end 461*a* and a plurality of first fixed ends 461*b*. One end that is of the first movable end 461*a* and that is far away from the first fixed end 461*b* connects to the first connection point 415, and the other end may electrically connect to the first fixed ends 461*b* through switching. One end of the first tuning element 462 connects to the first fixed end 461*b*, and the other end is grounded. When the first movable end 461*a* connects to different first fixed ends 461*b* through switching, different first tuning elements 462 connect to the antenna body 41, to adjust the electrical length of the antenna body 41, so as to change the frequency of the resonance of the first wavelength in the quarter wavelength mode and the frequency of the resonance of the second wavelength in the half wavelength mode. Based on different types of first switches 461, the first switch 461 may include one or more first movable ends 461*a*. Switching between different first fixed ends 461*b* is performed for different first movable ends 461*a*, so that a size, a type, and a quantity of first tuning elements 462 that connect to the antenna body 41 can be changed. For example, in the embodiment shown in FIG. 15*a*, the first switch 461 is a single-pole multi-throw switch, that is, the first switch 461 includes a plurality of first fixed ends 461*b*. Each first fixed end 461*b* connects to one first tuning element 462, and different first fixed ends 461*b* connect to different first tuning elements 462 (which may differ in type or specification and size). Therefore, when the first movable end 461*a* of the first switch 461 connects to a different first fixed end 461*b* through switching, the antenna body 41 connects to a different first tuning element 462, to change an electrical length of each section (including the section between the feed point 413 and the first end A, a section between the first end A and the second end B, or the like) of the antenna body 41. In this way, the antenna 40 can switch between different operating frequency bands based on an actual requirement, so that the antenna 40 of the electronic device 100 can cover more operating frequency bands. For example, in the embodiment shown in FIG. 15*a*, there are specifically four first fixed ends 461*b*, and the four first fixed ends 461*b* respectively connect to inductors of different sizes and then are grounded. When the first movable end 461*a* connects to another first fixed end 461*b* through switching from a first fixed end 461*b*, the electrical length between the feed point 413 and the first end A is changed, and therefore the frequency of the resonance that is of the first wavelength in the quarter wavelength mode and that is generated between the feed point 413 and the first end A is changed. In addition, the electrical length between the first end A and the second end B is changed, and therefore the frequency of the resonance that is of the second wavelength in the half wavelength mode and that is of the antenna 40 is changed.

Figure 15B:
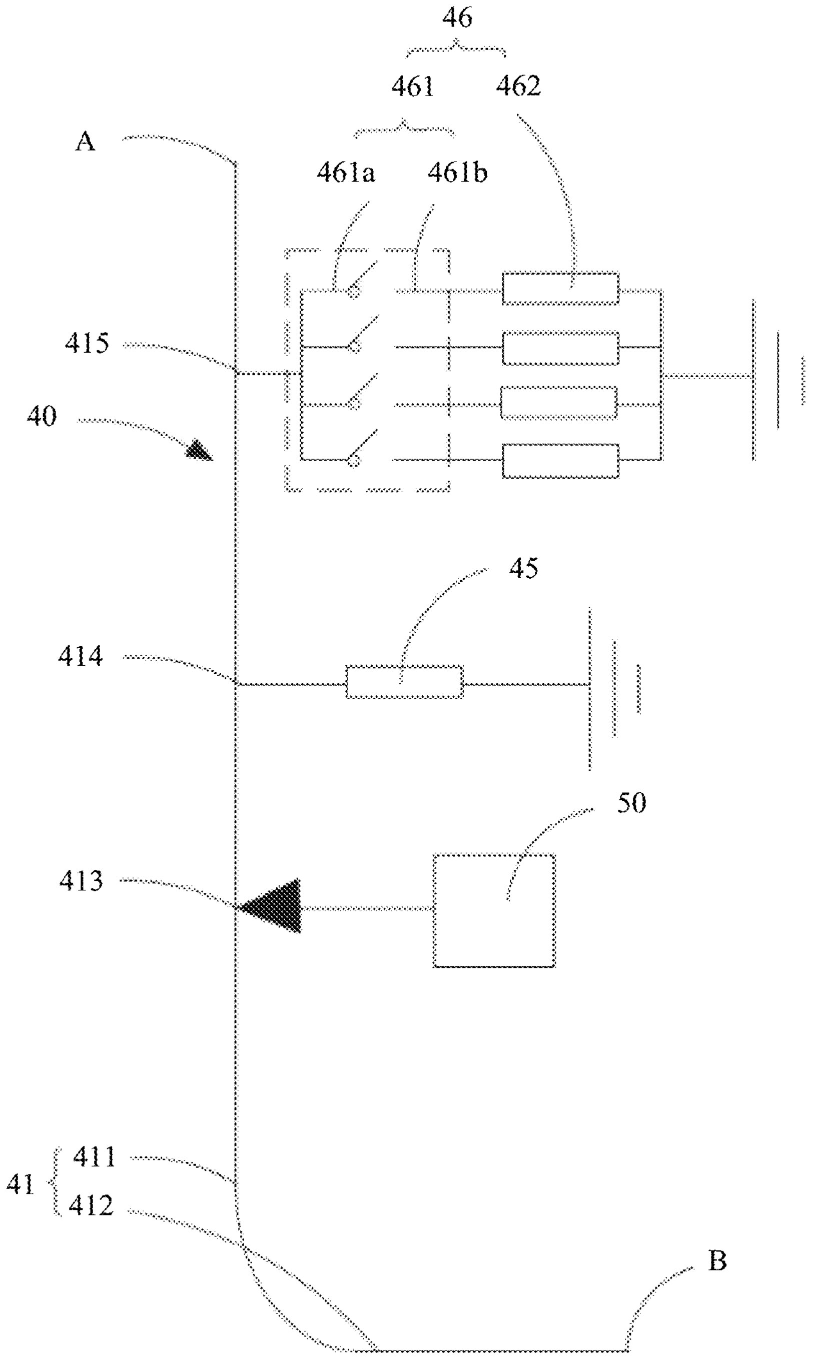
FIG. 15*b* is a schematic diagram of a structure of an antenna according to another embodiment.

FIG. 15*b* is another schematic diagram of a structure of the antenna 40 according to this application. In this embodiment, the first switch 461 is a multi-pole multi-throw switch, and a quantity of first movable ends 461*a* is the same as a quantity of first fixed ends 461*b*. Specifically, in this embodiment, there are four first movable ends 461*a* and four first fixed ends 461*b*, and the first movable ends 461*a* are in a one-to-one correspondence with the first fixed ends 461*b*. One end of each of the four first movable ends 461*a* connects to the first connection point 415, and the other end connects to or is disconnected from a first fixed end 461*b* corresponding to the first movable end 461*a*. In this way, a quantity of first tuning elements 462 that connect to the antenna body 41 can be controlled, to change the electrical length between the feed point 413 and the first end A of the antenna body 41 and the overall electrical length between the first end A and the second end B, so as to change the frequency of the resonance of the first wavelength in the quarter wavelength mode and the frequency of the resonance of the second wavelength in the half wavelength mode. For example, when two first movable ends 461*a* connect to first fixed ends 461*b* corresponding to the two first movable ends 461*a*, and the other two first movable ends 461*a* are disconnected from first fixed ends 461*b* corresponding to the other two first movable ends 461*a*, two first tuning elements 462 connect to the antenna body 41, and the two first tuning elements 462 are disposed in parallel.

Figure 16:
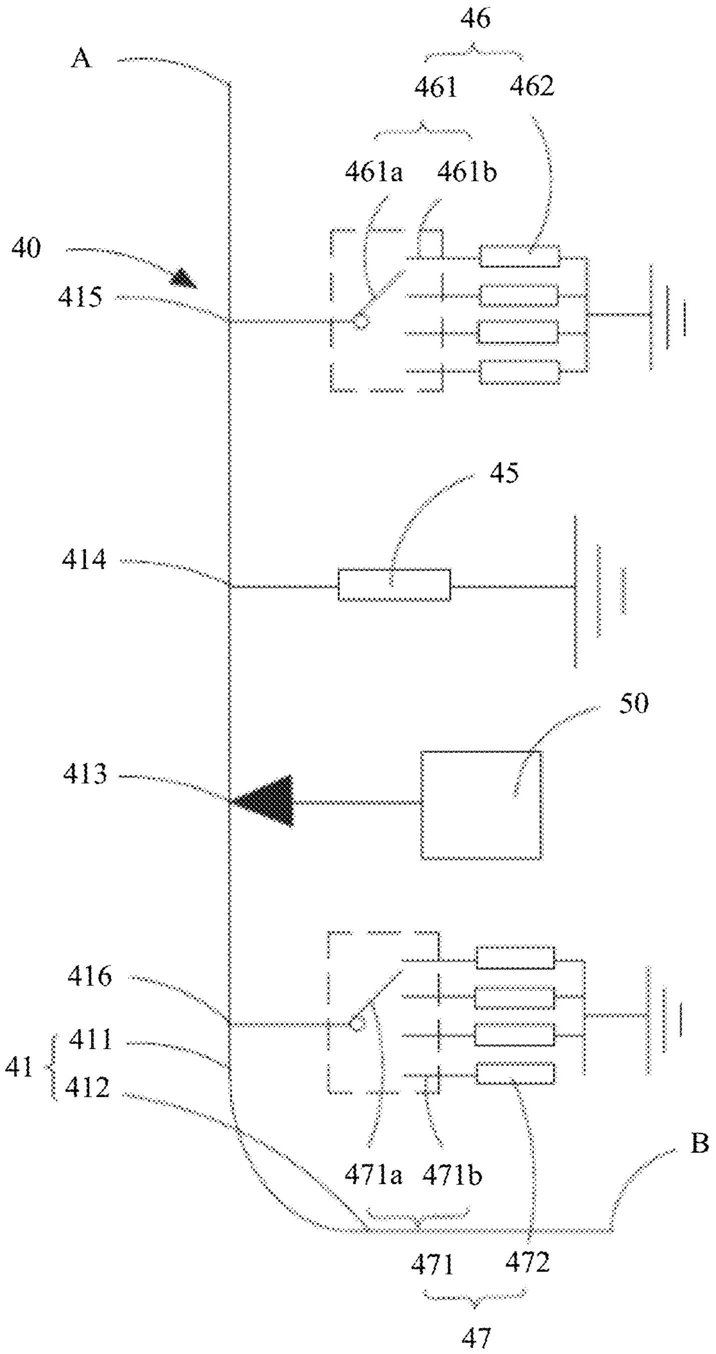
FIG. 16 is a schematic diagram of a structure of an antenna according to another embodiment.

FIG. 16 is a schematic diagram of a structure of the antenna 40 according to some other embodiments of this application. A difference between the embodiment shown in FIG. 16 and the embodiment shown in FIG. 15*a* lies in that the antenna 40 further includes a second switching circuit 47. A second connection point 416 is disposed on the antenna body 41, and the second switching circuit 47 connects to the second connection point 416. It should be noted that in this application, the second connection point 416 is not an actual point, and a position at which the second switching circuit 47 connects to the antenna body 41 is the second connection point 416. The feed point 413 and the grounding point 414 are located between the first connection point 415 and the second connection point 416. The second switching circuit 47 is of a structure similar to that of the first switching circuit 46, and includes a second switch 471 and a plurality of second tuning elements 472. The second switch 471 may connect to different second tuning elements 472 through switching. The first switching circuit 46 cooperates with the second switching circuit 47, to change the operating frequency of the resonance of the first wavelength in the quarter wavelength mode and the operating frequency of the resonance of the second wavelength in the half wavelength mode. Specifically, switching is performed for the first switch 461 of the first switching circuit 46, so that different first tuning elements 462 connect to the antenna body 41, and the second switch 471 of the second switching circuit 47 connects to different second tuning elements 472 through switching, to change the electrical length between the feed point 413 and the first end A or the second end B and the electrical length between the first end A and the second end B, so as to change the operating frequency of the resonance of the first wavelength in the quarter wavelength mode and the operating frequency of the resonance of the second wavelength in the half wavelength mode. In this way, the antenna 40 can cover more operating frequency bands. In this embodiment, the second switching circuit 47 is located on the side that is of the feed point 413 and the grounding point 414 and that is far away from the first end A, and the second switch 471 of the second switching circuit 47 connects to different second tuning elements 472 through switching, to change the electrical length between the feed point 413 and the second end B and the electrical length between the first end A and the second end B, so as to change the frequency of the resonance that is of the second wavelength in the half wavelength mode and that is of the antenna 40 by using the second switching circuit 47.

The second switch 471 may also be a physical switch such as a single-pole single-throw switch, a single-pole multi-throw switch, or a multi-pole multi-throw switch, or may be a switchable interface such as a mobile industry processor interface (Mobile Industry Processor Interface, MIPI) or a general-purpose input/output (General-purpose input/output, GPIO) interface. In this embodiment, the second switch 471 is a single-pole multi-throw switch, and includes a second movable end 471*a* and a plurality of second fixed ends 471*b*. One end of each second tuning element 472 correspondingly connects to one second fixed end 471*b*, and the other end is grounded. One end of the second movable end 471*a* connects to the second connection point 416, and the other end may connect to different second tuning elements 472 through switching.

In some embodiments, second tuning elements 472 that connect to the second fixed ends 471*b* of the second switching circuit 47 are in a one-to-one correspondence with first tuning elements 462 that connect to the first fixed ends 461*b* of the first switching circuit 46. When the first switch 461 connects to any first tuning element 462 through switching, the second switch 471 connects, through switching, to a second tuning element 472 corresponding to the first tuning element 462 that connects to the first switch 461, to correspondingly adjust the electrical length of each section of the antenna 40, so that the electrical length between the feed point 413 and the first end A can always be greater than the electrical length between the feed point 413 and the second end B, and it is ensured that the operating frequency of the resonance of the first wavelength in the quarter wavelength mode is less than the frequency of the resonance of the second wavelength in the half wavelength mode, and the difference between the frequency of the resonance of the first wavelength in the quarter wavelength mode and the frequency of the resonance of the second wavelength in the half wavelength mode ranges from 50 MHz to 200 MHz.

Figure 17:
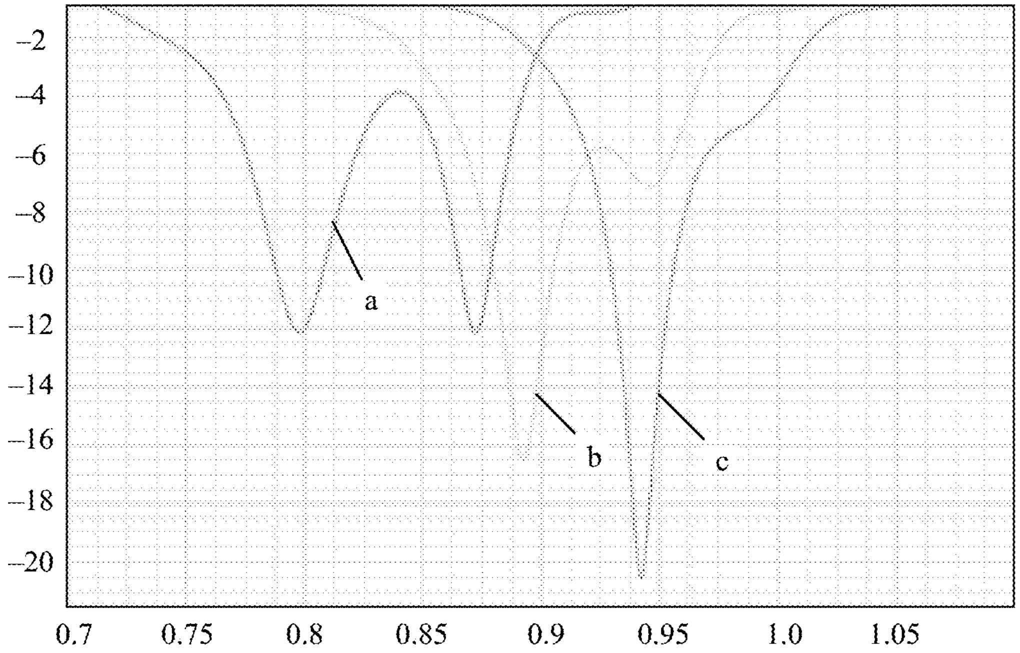
FIG. 17 is a diagram of a return loss existing when a movable end of a switch of the antenna shown in FIG. 16 separately connects to three different tuning elements through switching.
Figure 18:
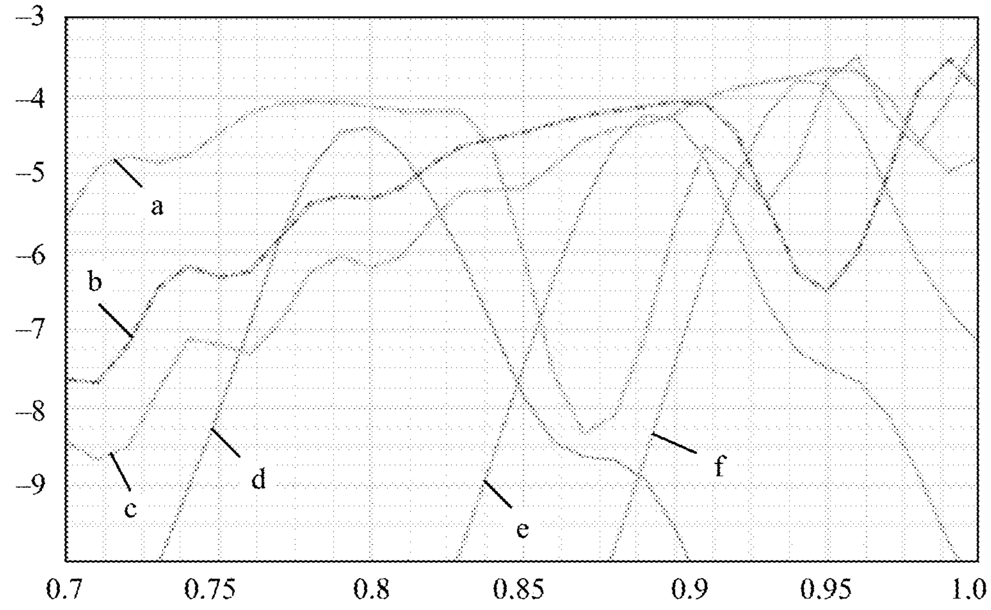
FIG. 18 is a diagram of system efficiency and radiation efficiency existing when a movable end of a switch of the antenna shown in FIG. 16 separately connects to three different tuning elements through switching.

FIG. 17 and FIG. 18 are respectively a diagram of a return loss and a diagram of system efficiency and radiation efficiency that exist when the first movable end 461*a* of the first switch 461 of the antenna 40 shown in FIG. 16 separately connects to three different first tuning elements 462 through switching and the second switch 471 switch correspondingly connects, through switching, to second tuning elements 472 corresponding to the first tuning elements 462 that connect to the first switch 461. In FIG. 17, a horizontal coordinate is a frequency (unit: GHz), and a vertical coordinate is a return loss coefficient (unit: dB). In FIG. 18, a horizontal coordinate is a frequency (unit: GHz), and a vertical coordinate is efficiency (unit: dB).

It may be learned from FIG. 17 that switching is performed for the first switch 461 and switching is correspondingly performed for the second switch 471, so that the antenna 40 can generate return loss curves at three different frequency bands. Specifically, curves a, b, and c in FIG. 17 respectively represent return loss curves generated by the antenna 40 at antenna bands B28 (from 703 MHz to 803 MHz), B5 (from 824 MHz to 894 MHz), and B8 (from 880 MHz to 960 MHz) when the electronic device 100 is in the free space. It may be learned from FIG. 17 that the antenna 40 can resonate at different operating frequency bands by performing switching for the first switch 461 and the second switch 471. In addition, the antenna 40 can generate two antenna modes (the resonance of the first wavelength in the quarter wavelength mode and the resonance of the second wavelength in the half wavelength mode) at different operating frequency bands. Therefore, the antenna 40 can have relatively high radiation performance both in the free space and in the beside head and hand mode. It may be further learned from the figure that when switching is performed for the first switch 461 and the second switch 471, and it is set that the first tuning element 462 that connects to the first switch 461 corresponds to the second tuning element 472 that connects to the second switch 471, the frequency of the resonance that is of the first wavelength in the quarter wavelength mode and that is of the antenna 40 is always less than the frequency of the resonance of the second wavelength in the half wavelength mode, and the difference between the frequency of the resonance of the first wavelength in the quarter wavelength mode and the frequency of the resonance of the second wavelength in the half wavelength mode ranges from 50 MHz to 200 MHz. In FIG. 18, curves a, b, and c respectively represent curve diagrams of radiation efficiency that are generated by the antenna 40 at the antenna frequency bands B28 (from 703 MHz to 803

MHz), B5 (from 824 MHz to 894 MHz), and B8 (from 880 MHz to 960 MHz) when the electronic device 100 is in the free space, and curves d, e, and f respectively represent curve diagrams of system efficiency that are generated by the antenna 40 at the antenna frequency bands B28, B5, and B8. It may be learned from FIG. 18 that at bandwidth of 80 MHz of each of different operating frequency bands (including B28, B5, and B8), efficiency of the antenna 40 is less than −6 dB, and therefore the antenna 40 has good radiation performance.

In this embodiment, the first switch 461 of the first switching circuit 46 and the second switching circuit 47 is a single-pole four-throw switch, so that the antenna 40 can cover four different operating frequencies. It may be understood that based on an actual requirement, the antenna 40 can cover more operating frequency bands by increasing a quantity of switching circuits, by using different first switches 461 and second switches 471, or the like. For example, in some embodiments, the first switch 461 of the first switching circuit 46 and the second switching circuit 47 is a multi-pole four-throw switch, so that the antenna 40 can cover 24 operating frequencies.

The foregoing descriptions are preferred implementations of this application. It should be noted that a person of ordinary skill in the art may further make several improvements or polishing without departing from the principle of this application and the improvements or polishing shall fall within the protection scope of this application.

What is claimed is:

1. An antenna, comprising an L-shaped antenna body, wherein the L-shaped antenna body comprises: a first end and a second end; a grounding point and a third tuning element, wherein the third tuning element is connected to the grounding point, wherein the third tuning element comprises at least one of a capacitor and an inductor; and a feed point, a physical length between the feed point and the first end is greater than a physical length between the feed point and the second end, the L-shaped antenna body is configured to generate a resonance of a quarter of a first wavelength between the feed point and the first end, and the L-shaped antenna body is configured to generate a resonance of a half of a second wavelength between the first end and the second end, wherein the first wavelength is greater than the second wavelength, a frequency difference between the resonance of a quarter of the first wavelength and the resonance of a half of the second wavelength ranges from 50 MHz to 200 MHz.

2. The antenna according to claim 1, wherein a directivity pattern of an antenna mode of the resonance of a quarter of the first wavelength, and a directivity pattern of an antenna mode of the resonance of a half of the second wavelength mode of the antenna, are complementary in space.

3. The antenna according to claim 1, wherein the antenna further comprises:

a first switching circuit, connected to a first connection point disposed on the L-shaped antenna body, wherein the first connection point is located on a side that is of the feed point and the grounding point and that is far away from the first end.

4. The antenna according to claim 3, wherein the antenna further comprises:

a second switching circuit, connected to a second connection point disposed on the L-shaped antenna body, wherein the feed point and the grounding point are both disposed between the first connection point and the second connection point.

5. The antenna according to claim 4, wherein the first switching circuit comprises a first switch and a plurality of different first tuning elements, and the first switch connects to the different first tuning elements.

6. The antenna according to claim 5, wherein the second switching circuit comprises a second switch and a plurality of different second tuning elements, and the second switch connects to the different second tuning elements.

7. The antenna according to claim 6, wherein the first switch is one of a single-pole single-throw switch, a single-pole multi-throw switch, or a multi-pole multi-throw switch; and the second switch is one of a single-pole single-throw switch, a single-pole multi-throw switch, or a multi-pole multi-throw switch.

8. The antenna according to claim 6, wherein the first tuning element and/or the second tuning element comprises at least one of a capacitor, an inductor, and a resistor.

9. The antenna according to claim 1, wherein:

the grounding point is disposed at an interval with the feed point.

10. The antenna according to claim 1, wherein no slot is disposed on the L-shaped antenna body.

11. The antenna according to claim 1, wherein mode excitation generated based on the resonance of a quarter of the first wavelength in the quarter wavelength mode of the antenna, is enhanced by the resonance of a half of the second wavelength.

12. The electronic device according to claim 1, wherein a resonant frequency of the first wavelength ranges from 699 MHz to 960 MHz.

13. The antenna according to claim 1, wherein the frequency difference ranges from 50 MHz to 150 MHz.

14. An electronic device, comprising: an antenna, comprising an L-shaped antenna body, wherein the L-shaped antenna body comprises: a first end and a second end; a grounding point and a third tuning element, wherein the third tuning element is connected to the grounding point, wherein the third tuning element comprises at least one of a capacitor and an inductor; and a feed point, a physical length between the feed point and the first end is greater than a physical length between the feed point and the second end, the L-shaped antenna body is configured to generate a resonance of a quarter of a first wavelength between the feed point and the first end, and the L-shaped antenna body is configured to generate a resonance of a half of a second wavelength between the first end and the second end, wherein the first wavelength is greater than the second wavelength, a frequency difference between the resonance of a quarter of the first wavelength and the resonance of a half of the second wavelength ranges from 50 MHz to 200 MHz; and a conductive frame, wherein the frame comprises a first edge and a second edge that intersects with the first edge, a first slot is disposed on the first edge, a second slot is disposed on the second edge, a part that is of the frame and that is located between the first slot and the second slot forms the L-shaped antenna body.

15. The electronic device according to claim 14, wherein a resonant frequency of the first wavelength ranges from 699 MHz to 960 MHz.

16. The electronic device according to claim 14, wherein the frequency difference ranges from 50 MHz to 150 MHz.

17. The electronic device according to claim 14, wherein no slot is disposed on the L-shaped antenna body.

18. The electronic device according to claim 14, wherein the resonant frequency of the first wavelength comprises any one of the following frequency bands:

B28 frequency band, B5 frequency band, and B8 frequency band.

19. The electronic device according to claim 14, wherein the resonant frequency of the first wavelength, and a resonant frequency of the second wavelength comprises different frequency bands.

20. The electronic device according to claim 14, wherein the distance between the first slot and the second edge is greater than or equal to 90 mm.

21. The electronic device according to claim 14, wherein the L-shaped antenna body has a first clearance at the first edge of the frame, and the L-shaped antenna body has a second clearance at the second edge of the frame, wherein the first clearance is greater than the second clearance.

22. The electronic device according to claim 14, wherein mode excitation generated based on the resonance of a quarter of the first wavelength in the quarter wavelength mode of the antenna, is enhanced by the resonance of a half of the second wavelength.

23. The electronic device according to claim 14, wherein the antenna further comprises:

a first switching circuit, connected to a first connection point disposed on the L-shaped antenna body, wherein the first connection point is located on a side that is of the feed point and the grounding point and that is far away from the first end.

24. The electronic device according to claim 23, wherein the antenna further comprises:

a second switching circuit, connected to a second connection point disposed on the L-shaped antenna body, wherein the feed point and the grounding point are both disposed between the first connection point and the second connection point.

25. The electronic device according to claim 24, wherein the first switching circuit comprises a first switch and a plurality of different first tuning elements, and the first switch connects to the different first tuning elements.

26. The electronic device according to claim 25, wherein the second switching circuit comprises a second switch and a plurality of different second tuning elements, and the second switch connects to the different second tuning elements.

27. The electronic device according to claim 26, wherein the first tuning element and/or the second tuning element comprises at least one of a capacitor, an inductor, and a resistor.

28. The electronic device according to claim 14, wherein: the grounding point is disposed at an interval with the feed point.

* * * * *